(12) United States Patent
Pandey

(10) Patent No.: US 12,007,957 B2
(45) Date of Patent: *Jun. 11, 2024

(54) DATABASE CONNECTION REFRESH FOR SERVER INSTANCES AND LIVE DATABASE UPDATES

(71) Applicant: Oracle International Corporation, Redwood Shores, CA (US)

(72) Inventor: Pradip Kumar Pandey, Parker, CO (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/149,339

(22) Filed: Jan. 3, 2023

(65) Prior Publication Data

US 2023/0147232 A1 May 11, 2023

Related U.S. Application Data

(63) Continuation of application No. 17/146,744, filed on Jan. 12, 2021, now Pat. No. 11,544,237.

(51) Int. Cl.
| | |
|---|---|
| *G06F 16/21* | (2019.01) |
| *G06F 8/65* | (2018.01) |
| *G06F 9/48* | (2006.01) |
| *G06F 9/52* | (2006.01) |
| *G06F 16/25* | (2019.01) |

(52) U.S. Cl.
CPC ............. *G06F 16/21* (2019.01); *G06F 8/65* (2013.01); *G06F 9/4881* (2013.01); *G06F 9/52* (2013.01); *G06F 16/252* (2019.01)

(58) Field of Classification Search
CPC .................................. G06F 8/65; G06F 16/252
See application file for complete search history.

(56) References Cited

U.S. PATENT DOCUMENTS

| 10,951,606 B1* | 3/2021 | Shahidzadeh ........... H04W 4/14 |
| 2008/0177994 A1* | 7/2008 | Mayer ..................... G06F 16/00 |
| | | 709/224 |
| 2018/0337907 A1* | 11/2018 | Bhansali ............. H04L 63/0876 |
| 2019/0313147 A1* | 10/2019 | Cava ..................... H04L 65/612 |
| 2022/0046036 A1* | 2/2022 | Bastawala ........... H04L 63/1416 |
| 2022/0222224 A1* | 7/2022 | Pandey ................. G06F 16/252 |

* cited by examiner

*Primary Examiner* — Eliyah S. Harper
(74) *Attorney, Agent, or Firm* — Kilpatrick Townsend & Stockton LLP

(57) ABSTRACT

Threads and kernels across multiple server instances may maintain static connections to a database during operation. To apply a patch or other upgrade to the database, a notification may be sent to the database system that causes the database system to redirect new incoming connection requests for the database to a backup database. A second notification may also be sent to each of the server instances where threads maintain active connections to the database. These threads may be allowed to finish executing a current job, then when entering the idle state these threads may be directed to refresh their connections. This refresh operation may be redirected to the backup database. The patch may be applied after all connections have been switched to the backup database. This process switches static connections to the backup database as quickly as possible without interrupting existing thread operations.

20 Claims, 16 Drawing Sheets

DATABASE CONNECTION REFRESH FOR SERVER INSTANCES AND LIVE DATABASE UPDATES

CROSS-REFERENCES TO RELATED APPLICATIONS

This application is a continuation of U.S. patent application Ser. No. 17/146,744, filed Jan. 12, 2021, entitled "DATABASE CONNECTION REFRESH FOR SERVER INSTANCES AND LIVE DATABASE UPDATES," which is hereby incorporated by reference in its entirety.

BACKGROUND

Server intances may be designed to handle many different types of workloads. A diverse set of workloads may be received by the server instance from a large number of different client devices. To simultaneously service thousands of workload requests from users, a server instance may employ a large number of kernels that operate in parallel. Each of these kernels may further include multiple threads that operate in parallel. This large-scale parallel processing on a single server instance allows thousands of workloads to be processed at a time.

However, increasing the number of kernels and threads operating on a server instance may also generate a number of technical problems. During peak usage intervals, operating system resource contention may become severe for resources such as memory, processing power, disk space, shared memory, and so forth. One such resource is shared database systems that manage data for multiple threads and server instances. Applying patches or upgrades to individual databases in the database system may be problematic when maintaining consistent workloads for the server instances. Typically, the static connections to these databases must be terminated and the databases off-line must be taken offline to apply the patch. This interrupts processing operations for the server instances, thus reducing the throughput for processing workloads from client devices.

BRIEF SUMMARY

Threads and kernels across multiple server instances may maintain static connections to a database during operation. To apply a patch or other upgrade to the database, a notification may be sent to the database system that causes the database system to redirect new incoming connection requests for the database to a backup database. A second notification may also be sent to each of the server instances where threads maintain active connections to the database. These threads may be allowed to finish executing a current job, then when entering the idle state these threads may be directed to refresh their connections. This refresh operation may be redirected to the backup database. The patch may be applied after all connections have been switched to the backup database. This process switches static connections to the backup database as quickly as possible without interrupting existing thread operations.

When a patch is received to be applied to a database in the database system, a server manager may send a notification to the database system that the patch is available. In response, the database system may redirect incoming new connection requests for the database to a backup database or set of databases. When new requests to establish static connections to the database are received, the database system can instead provide a connection to the backup database, which may be done transparently to the requesting kernel. This ensures that new connection requests are diverted away from the database to the backup database.

Next, the server manager may send a notification to each of the server instances that have threads holding static connections to the database. Instead of terminating or interrupting the current workload processing of these threads, the server instances may send a message to the governing processes indicating that existing connections to the database should be refreshed. A main thread in a process may place a lock on any threads that are currently executing with a connection to the database. When those threads finish processing the current workloads and enter the idle state, the threads may individually refresh their connections to the database system. This refresh operation may shift the connection from the database to the backup database. This allows each individual thread to finish their processing operations and perform a refresh operation when they enter the idle state area, thus allowing the patch to be applied as quickly as possible without interrupting the normal operations of the server instances.

After the notifications have been sent to the database system and the server instances, the server manager may poll the server instances and/or the database system until it can determine that there are no active connections to the database. The patch may then be applied while the server instances are connected to the backup database. Once the patch has been applied, the static database connections may be shifted back to the database using the same process, either immediately or when the backup database receives a patch. Alternatively, these connections may be allowed to migrate slowly back to the database as existing connections are removed and new connections are made.

BRIEF DESCRIPTION OF THE DRAWINGS

A further understanding of the nature and advantages of various embodiments may be realized by reference to the remaining portions of the specification and the drawings, wherein like reference numerals are used throughout the several drawings to refer to similar components. In some instances, a sub-label is associated with a reference numeral to denote one of multiple similar components. When reference is made to a reference numeral without specification to an existing sub-label, it is intended to refer to all such multiple similar components.

DETAILED DESCRIPTION

Figure 1:
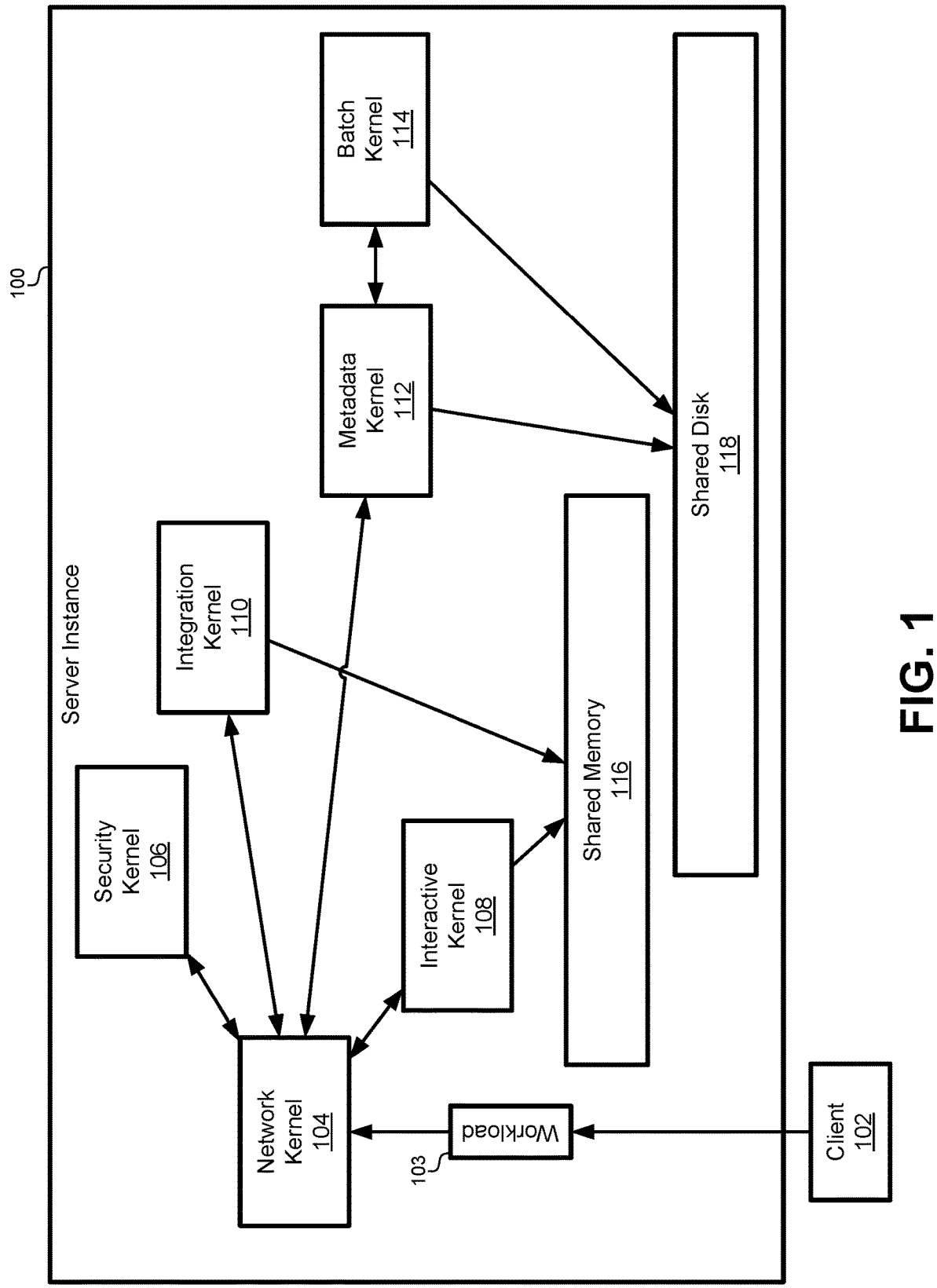
FIG. 1 illustrates a server instance that accepts workloads from client devices, according to some embodiments.

FIG. 1 illustrates a server instance 100 that accepts workloads from client devices, according to some embodiments. The server instance 100 may include a virtual machine running in a cloud environment, such as a single Java-EE-compatible Java virtual machine hosting an application server on a node. In some cases, the server instance 100 may be a member of a cluster and may share applications, resources, and configurations with the cluster. In other cases, the server instance 100 need not belong to a cluster, and as such may have an independent set of applications, resources, and configurations. For example, the server instance 100 may include web servers, web containers, messaging services, and/or a runtime control for managing multiple processes/threads that are shared or exclusive to the server instance 100.

Many different processes and components may be part of the server instance 100. In the example of FIG. 1, the server instance 100 may include a plurality of kernels. As used herein, each of the kernels may refer to a specific kernel in the traditional computing sense as a process that interfaces between the virtual or real hardware layer of the server instance 100 and the application layer. Each of the kernels may be designed to handle specific types of applications or jobs. For example, the server instance 100 may include a security kernel 106 to handle security procedures and enforce access to secure computing resources. The server instance 100 may also include a network kernel 104 that acts as an interface between an external network and the other kernels in the server instance 100. Other kernel types may include an interactive kernel 108, an integration kernel 110, a metadata kernel 112, a batch kernel 114, and/or other kernels not specifically illustrated in FIG. 1. Each of these kernels may be designed to perform specific functions, such as executing workloads that are submitted by client devices.

A client device 102 may submit a workload 103 to the server instance 100 for processing. Once received, the workload 103 may be referred to herein as a "job" to be executed by one or more of the kernels in the server instance 100. For example, the workload 103 may be received by the network kernel 104, which may act as a router and/or load balancer for the server instance 100. The network kernel 104 may determine which of the remaining kernels in the server instance 100 is qualified and/or available to handle processing one or more jobs represented by the workload 103. The network kernel 104 may then distribute the jobs to one or more of the remaining kernels. In some cases, the workload 103 may be split into multiple jobs that are handled by multiple kernels. For example, a job of batch transactions may be submitted to the metadata kernel 112 to prepare disk space for the results of the batch processing before passing the job to the batch kernel 114. Similarly, the integration kernel 110 may execute a job for the workload 113 before the interactive kernel 108 executes another job for the workload 113. Thus, the workload 103 may be processed by multiple kernels in the server instance 100, and dependencies between the jobs executed by multiple kernels may exist such that one kernel may need to wait on the execution of another kernel before processing a job.

In order to facilitate the processing of multiple jobs associated with the same workload 103, shared resources may be used in the server instance 100. In this example, a shared memory 116 and/or a shared disk 118 may be used by multiple kernels performing jobs for the same workload 103. For example, the interactive kernel 108 may write to a memory location in the shared memory 116 for the workload 103. After the interactive kernel 108 has completed the write operation, the integration kernel 110 may read that memory location to perform another job related to the workload 103. As described below, the portion of the shared memory 116 that is shared between the jobs executed by the interactive kernel 108 and the integration kernel 110 may be locked during a write operation such that other kernels do not try to read from the shared memory location until the lock is released.

In another example, the metadata kernel 112 may prepare a portion of the shared disk 118 for receiving results of the batch process. The batch job to be executed by the batch kernel 114 may generally wait until the disk location has been prepared on the shared disk 118 by the metadata kernel 112. After the disk location on the shared disk 118 is ready, the batch kernel 114 may begin writing to the shared disk 118 as results are generated. Batch processes may include batch transactions, repeated calculations, and/or any other similar transactions. As the metadata kernel 112 uses the shared disk 118, a lock may be placed on that portion of the shared disk 118. The batch kernel 114 may then wait until the lock is released and/or the process executed by the metadata kernel 112 has completed before processing its own job.

The example of FIG. 1 may be greatly simplified in terms of the number of workloads, jobs, and/or kernels that may be simultaneously processed and executed by the server instance 100. On a single server instance, hundreds kernels may simultaneously handle hundreds or even thousands of submitted workloads from hundreds or thousands of client devices. Hundreds of different kernels may all compete for the same shared memory 116 and/or shared disk 118. As the number of requests from client devices increases, the more the shared memory 116 and/or shared disk 118 may become a bottleneck in performance. As more kernels wait for shared memory locations or shared files, the more inefficient the execution of the server instance 100 becomes.

Figure 2:
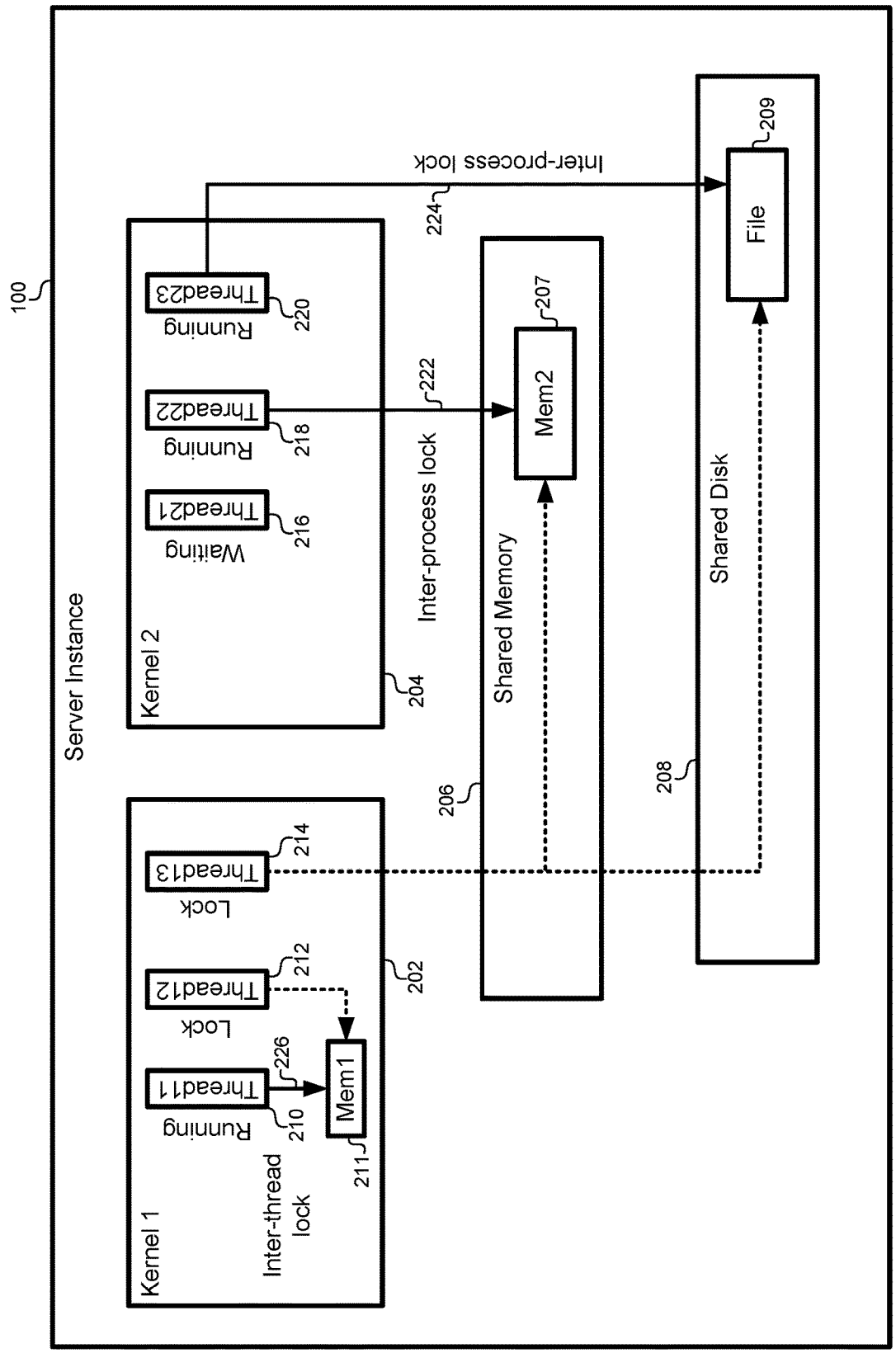
FIG. 2 illustrates an example of the different types of locks that may be active in the server instance, according to some embodiments.

FIG. 2 illustrates an example of the different types of locks that may be active in the server instance 100, according to some embodiments. One or more threads may execute in each of the kernels performing a job in the server instance 100. Each of these threads may operate in parallel to perform different aspects of the job executed by the kernel. In this example, the server instance 100 includes kernel 202 executing threads 210, 212, 214. The server instance may also include kernel 204 executing threads 216, 218, 220. It is to be understood that the server instance 100 may include many additional kernels that are not explicitly illustrated in FIG. 2. Additionally, each of the kernels 202, 204 may include additional threads that are not explicitly illustrated in FIG. 2.

Each of the kernels 202, 204 may have an internal memory that may be shared between each of the threads executing within that specific kernel. For example, kernel 202 may include a shared memory 211. Each of the threads 210, 212, 214 in kernel 202 may write/read information to/from the shared memory 211. Using the shared memory 211 may be a more efficient way of sharing data between parallel threads when compared to direct messaging or parameter passing. When a thread needs read and/or write access to the shared memory 211, a lock may be placed on the shared memory 211 to prevent other threads in the kernel 202 from simultaneously reading and/or writing to at least that portion of the shared memory 211. For example, when thread 210 needs to write to the shared memory 211, thread 210 may acquire a lock 226 on the shared memory 211. This lock 226 may encompass the entire shared memory 211, or alternatively may encompass only a defined subset of the shared memory 211 used by thread 210. While the lock 226 is active for the shared memory 211, other threads in the kernel 202 may be prevented from accessing at least the locked portion of the shared memory 211. For example, if thread 212 attempts to access the shared memory 211 while the lock 226 is active, the thread 212 may instead enter a wait state or a "lock" state until the lock 226 is released. In some embodiments, the execution of thread 212 may pause while in the "lock" state until the lock 226 is released. This type of lock 226 may be referred to as an inter-thread lock.

In addition to the inter-thread lock 226 for the shared memory 211 inside of kernel 202, some embodiments may also use inter-process locks on a shared memory 206 within the server instance 100. In contrast to shared memory 211, shared memory 206 is not exclusive to a particular kernel. Instead, shared memory 206 may be shared between any of the kernels operating in the server instance 100. Shared memory 206 may be used to communicate results between different kernels that execute related jobs in parallel. For example, multiple jobs related to the same workload may execute on different kernels, and data may be shared between these kernels using the shared memory 206.

When an inter-process lock is requested, the shared memory 206 may lock a specific memory location 207 in the shared memory 206 related to the lock. For example, when thread 218 in kernel 204 requests the lock 222, the shared memory 206 may prevent other threads and/or kernels from accessing the memory location 207. Note that the memory location may include a memory block that includes multiple individual memory locations. Like thread 210 in the example above, thread 218 may be assigned a state of "running" or "active" indicating that the thread 218 is executing and not waiting on any other lock. If a thread in kernel 204 and/or a thread in another kernel attempts to access the memory location 207 while the lock 222 is active, the waiting thread may indicate a "lock" status until the lock 222 is released. For example, thread 214 in kernel 202 may have a "lock" status until the lock 222 is released and thread 214 may access the memory location 207.

Inter-process locks may be used on the shared memory 206, and they may also be used on a shared disk 208. As described above, multiple kernels may be involved when allocating, preparing, writing, and/or reading to a file 209 on the shared disk 208. A metadata kernel may prepare the file 209, while a batch kernel may write results to the file 209. To avoid collisions while accessing the file 209, a lock 224 may be granted to one kernel at a time. For example, thread 220 in kernel 204 may represent a thread in a metadata kernel that is preparing the file 209. The lock 224 may prevent thread 214 in kernel 202 representing a batch kernel from writing results to the file 209 until the lock 224 is released.

Each of the threads in a kernel may be part of a job that is executing on that kernel. Each of the threads may also be associated with a particular status that is updated in real time as the thread executes. Among the different threat statuses that may be assigned are the "running" status indicating that the thread is executing and not waiting on any locks to be released, the "lock" status indicating that the thread is paused and waiting for a lock to be released, and a "waiting" status indicating that the thread is not executing and is waiting for a job to be assigned to the thread. Note that each of the threads in a kernel may be assigned the "waiting" status if a job has not yet been assigned to the kernel. These statuses may be available in a call stack for each of the threads. For example, a call stack for thread 212 may indicate that thread 212 is in a "lock" state waiting for the shared memory 211 to be released from the lock 226 held by thread 210.

Figure 3:
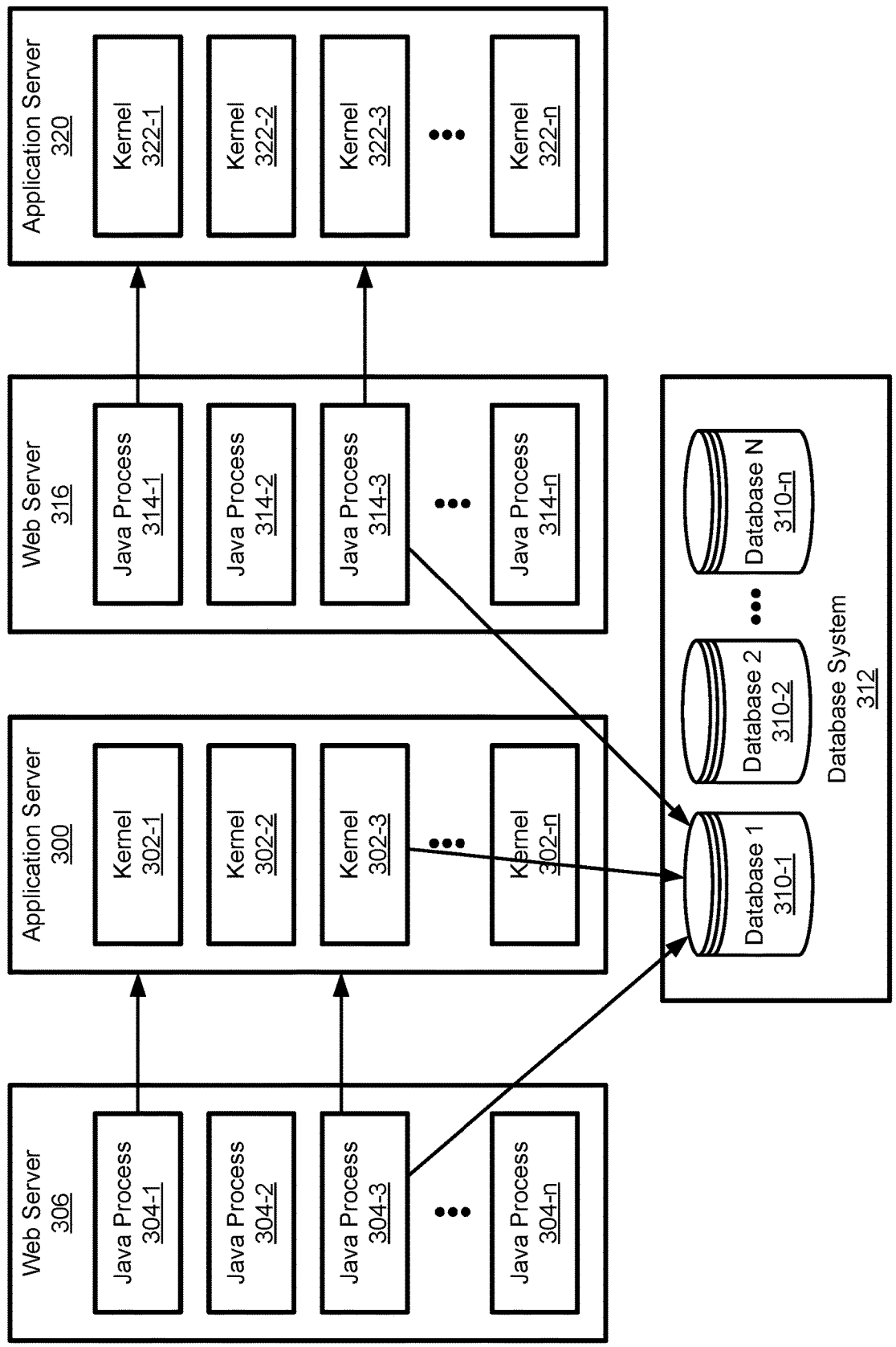
FIG. 3 illustrates how multiple server instances may operate with connections to a database system, according to some embodiments.

FIG. 3 illustrates how multiple server instances may operate with connections to a database system, according to some embodiments. The server instances described above in FIG. 1 and FIG. 2 may include different types of server instances. For example, a server instance may be implemented as an application server. Server instances that include job kernels that execute specific types of jobs on behalf of workload request by client devices may be referred to as application servers. An application server may be a server that is specifically designed to run applications. These applications may be implemented by the job kernels described above.

In addition to application servers, some embodiments may also implement server instances as web servers. A web server may include software and processes that allow client devices to access hosted files and services. For example, the web server may implement an HTTP server that responds to requests for web forms, web services, web pages, and other web content. The specific operations performed by the web server may be performed by individual processes, such as Java processes.

The example of FIG. 3 illustrates an operating environment that includes multiple server instances operating in concert with each other. This example includes a web server 306 that operates in conjunction with an application server 300. The web server 306 may include a plurality of Java processes 304 that execute the operations of the web server. Note that the Java processes 304 are provided only by way of example, and other types of processes may be used in other implementations without limitation. The processes 304 may receive web requests or other network interactions from client devices, and the processes 304 may pass information to the application server 300. The application server 300 may include a plurality of job kernels 302 as described above. The job kernels may receive requests from the processes 304 of the web server 306 and process workloads as described above.

Multiple types of each server instance may be implemented in the operating environment. For example, FIG. 3 illustrates how another web server and application server pair may operate alongside web server 306 and application server 300. For example, web server 316 may operate in conjunction with application server 320. A plurality of processes 314 on web server 316 may interact with job kernels 322 on the application server 320. In some embodiments, the web servers 306, 316 need not be paired with application servers 300, 320 on a one-to-one basis. Instead, web server 306 may send jobs to application server 300 and application server 320. Thus, any arrangement of web servers and application servers may be used in conjunction with the database update process described in this disclosure.

The web servers 306, 316 and/or the application servers 300, 320 may use a database system 312 to store data associated with the processes 304, 314 and/or kernels 302, 322. The database system 312 may include a plurality of databases 310. The database system 312 may store a mix of unique databases and/or copies, mirrors, or backups of other databases in the database system 312. For example, a first database 310-1 may store data provided from a number of different server instances. A second database 310-2 may include a mirror or copy of at least a portion of the data stored in the first database 310-1. In some embodiments, the second database 310-2 may include a complete copy of data stored in the first database 310-1. The second database 310-2 may be kept up-to-date with information stored in the first database 310-1 such that data written to the first database 310-1 is also written to the second database 310-2. The second database 310-2 may serve as a backup copy of the information in the first database 310-1.

The terms "first database" and "second database" are used merely to distinguish one database from another database. In some embodiments, the "second database" may include a plurality of databases that together provide a copy of the data stored on the first database 310-1. FIG. 3 illustrates a single database as the second database 310-2 in the interest of clarity. However, it should be understood that the second database 310-2 may include multiple individual databases that store portions of the data stored on the first database 310-1.

The first database 310-1 may receive connections from processes and/or kernels in the different server instances. For example, the first database 310-1 may include a connection from a process 304-3 in web server 306, a kernel 302-3 in application server 300, and a process 314-3 in web server 316. These connections may be static connections. A static connection to a database may imply that a connection is maintained between the process/kernel between individual requests to the database. For example, the static connection between the process 304-3 and the first database 310-1 may be maintained by a thread in the process 304-3 while the thread executes. The static connection may be maintained while multiple requests are passed back and forth between the process 304-3 and the first database 310-1.

Maintaining a static connection between processes and databases provides a number of advantages when processing data at the server instances. The static connection reduces the overhead of establishing a new connection for each request to the database system 312. Instead, an existing connection may be used to send multiple requests over time. This reduces the bandwidth between the server instances and the database system 312 and increases the speed with which the server instances may process user requests from client devices.

However, a technical problem exists when using static connections between processes/kernels and databases. Specifically, when a database in the database system 312 is to be patched, the existing static connections may need to be terminated to the database. Typically, the first database 310-1 would be taken off-line, thus interrupting threads using connections to the first database 310-1 and decreasing the responsiveness and speed with which workloads can be processed. Alternatively, some previous systems waited until the first database 310-1 no longer maintained any active connections to threads in the server instances. However, this may take hours or days for all a time window to occur during which no static connections remain active. The benefits of using static connections between threads in processes/kernels included a trade-off that caused the database patching process to either be highly disruptive or to not be immediately responsive.

The embodiments described herein solve these and other technical problems by sending a first notification to the database system 312 that causes the database system 312 to redirect incoming connection requests for the first database 310-1 to the second database 310-2. From the time this notification is sent, the system can then ensure that no new connections are established to the first database 310-1. These connections instead are redirected to the backup or mirror data that is available on the second database 310-2. Next, the system can identify any processes on any server instances that currently maintain static connections to the first database 310-1. The system may send a notification to each of the server instances to refresh the static database connections as soon threads using these connections are idle. For example, a thread in a job kernel may continue to execute its workload until it is complete, at which point the kernel may cause the thread to refresh its connection to the database system 312 after entering an idle state. This refresh operation may move the static connection from the first database 310-1 to the second database 310-2. The system may then poll the server instances and/or the database system to determine when the existing static connections to the first database 310-1 have been removed. When the first database 310-1 is clear of existing connections, and operating under the assumption that no new connections have since been made to the first database 310-1, the system may then cause the patch to be applied to the first database 310-1.

This process improves the functioning of the database system 312 and/or the server instances in a number of different ways. First, this process allows the benefits of static connections to the database system 312 to be maintained while minimizing the delay and intrusiveness of applying a patch to the first database 310-1. Threads are allowed to execute individually and refresh when they finish processing a current job or workload. This prevents the upgrade process from interfering with active jobs or workloads being processed by a thread, while still minimizing the delay between when the patch is received and when it is applied to the database system 312. Because the system deals with threads individually, the system does not have to wait for each of the threads holding static connections to be idle at the same time. Instead, the system can refresh the connection of each thread when each thread finishes processing a current workload.

Figure 4:
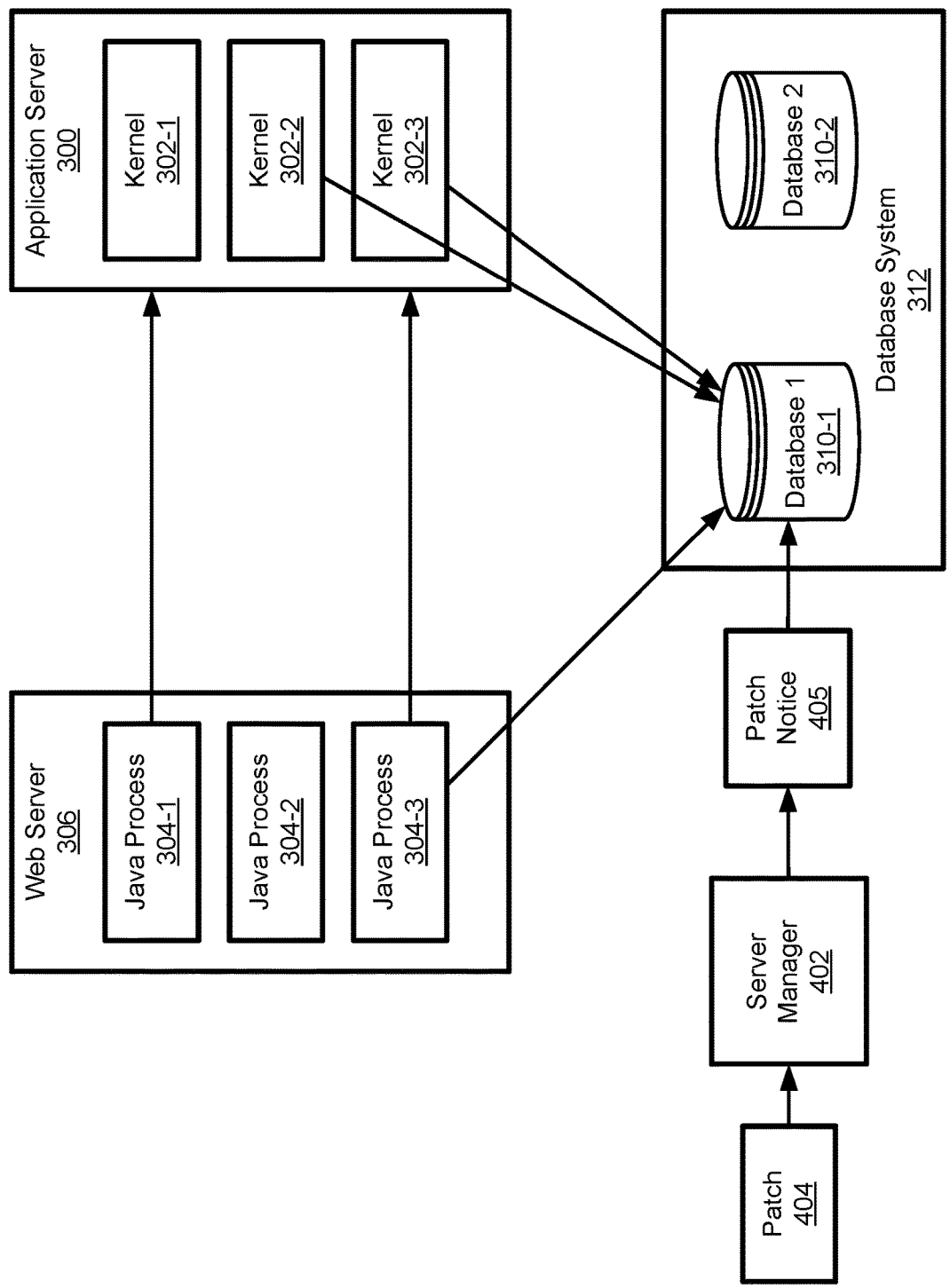
FIG. 4 illustrates how a first notification may be sent to the database system to redirect incoming requests, according to some embodiments.

FIG. 4 illustrates how a first notification may be sent to the database system 312 to redirect incoming requests, according to some embodiments. This example shows a server manager 402 that coordinates the communications with the database system 312 and the server instances to apply patches to databases in the database system 312. A patch 404 may be received by the server manager 402. The server manager 402 may receive an actual patch to be applied to the database system 312, or the patch 404 may represent a notification that a lifecycle management system or other process is ready to apply a patch to the database system 312. Therefore, the server manager may represent a process that coordinates the patching activity, the operation of the database system 312, and/or refreshing the static connections to the database system 312 for the server instances. The server manager 402 may be implemented as part of a lifecycle management system that applies patches, or the server manager 402 may be implemented as a separate process from a lifecycle management system.

When the patch 404 is received by the server manager 402, the server manager 402 may generate a first notification 405 to the database system that causes the database system to redirect incoming connection requests for the first database 310-1 to the second database 310-2. In some embodiments, the first notification 405 may include a notice that a patch needs to be applied to the first database 310-1. The database system 312 may then interpret the first notification 405 as an instruction to redirect incoming connections to the first database 310-1 to the second database 310-2. Redirecting the incoming connections may be done such that they are transparent to a requesting server instance. For example, some embodiments may receive a request for a static connection from a server instance that requests a connection to the data in the first database 310-1. The database system 312 may respond with a connection or view to the second database 310-2 such that the requesting server instance is not notified of the difference. In other embodiments, a request may be redirected by establishing a static connection to the second database 310-2 and sending a response back to the requesting server instance that a static connection to the second database 310-2 was established instead.

Figure 5:
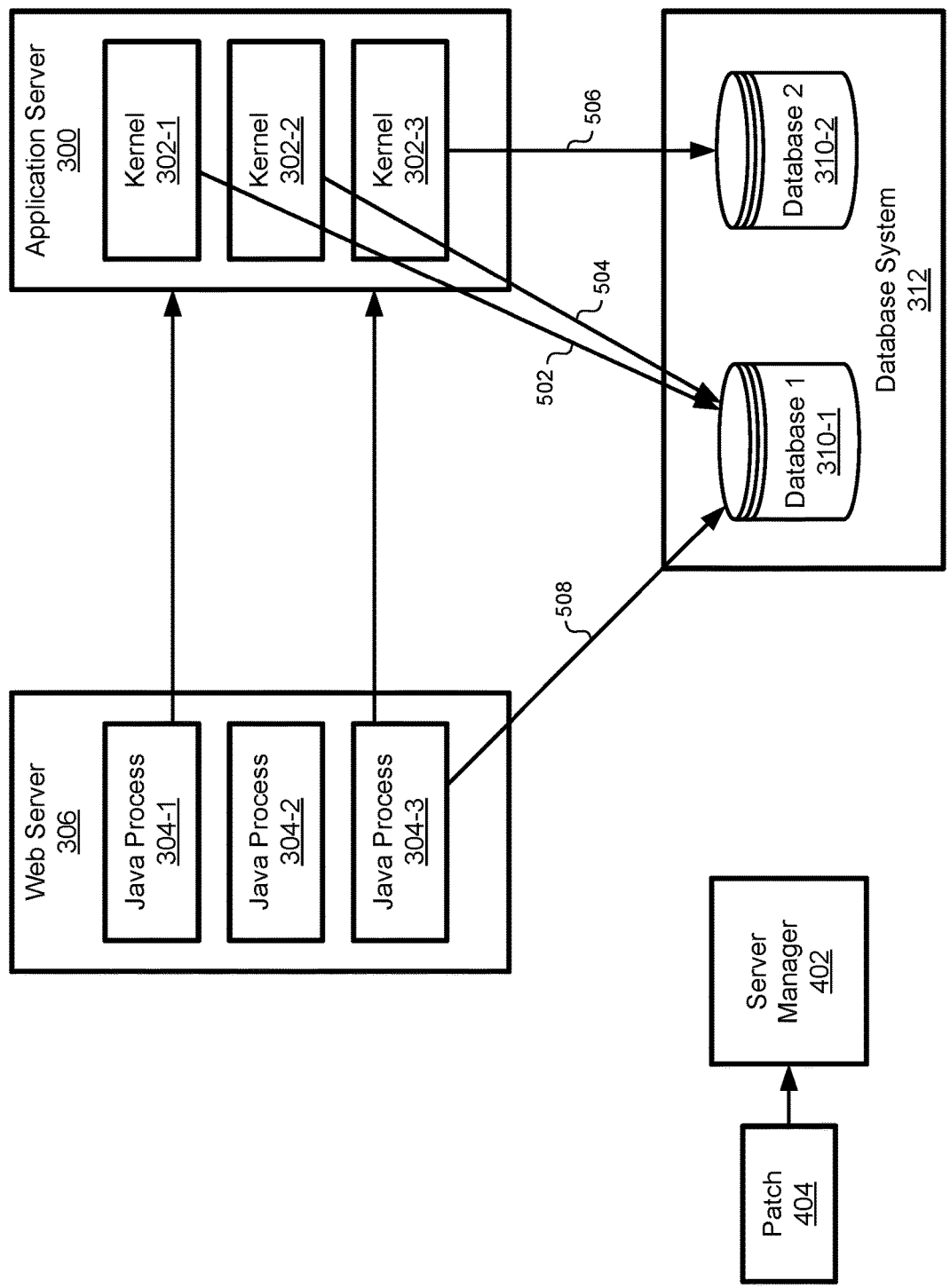
FIG. 5 illustrates an example of a redirected request for a connection to the database system, according to some embodiments.

FIG. 5 illustrates an example of a redirected request for a connection to the database system 312, according to some embodiments. In this example, a job kernel 302-3 executing on application server 300 may request a new connection to the first database 310-1 at the database system 312. Instead, the request may be redirected such that a static connection 506 is established between the kernel 302-3 and the second database 310-2. Note that none of the existing connections to the first database 310-1 have been altered by virtue of the first notification sent from the server manager 402. Instead, these connections may be maintained until they are refreshed by the corresponding threads at the server instances. In this example, connections 502, 504, 508 have been maintained without interruption even though the new connection request resulting in the static connection 506 has been newly established after the first notification is received from the server manager 402. As described below, these existing connections 502, 504, 508 are maintained such that the operations of the corresponding threads are not disrupted. These connections 502, 504, 508 may be refreshed individually as the corresponding threads become idle.

Figure 6:
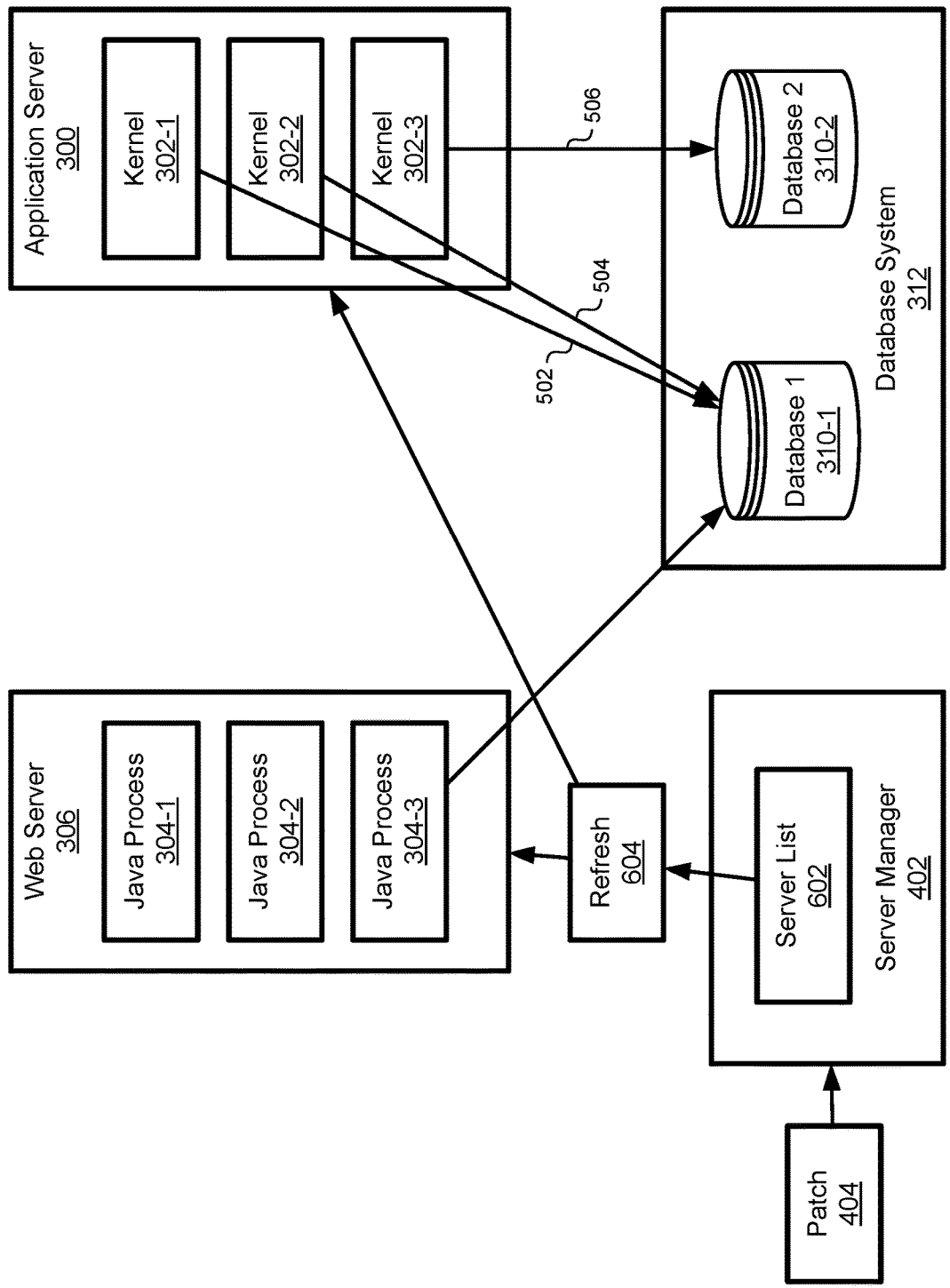
FIG. 6 illustrates how a second notification may be sent to server instances that maintain static connections to the first database, according to some embodiments.

FIG. 6 illustrates how a second notification may be sent to server instances that maintain static connections to the first database, according to some embodiments. After sending the first notification to the database system 312, second notification 604 may be sent to any of the server instances that maintain a current static connection to the first database 310-1. For example, the server manager 402 may maintain a server list 602 that identifies any of the server instances in the operating environment that maintain static connections to the first database 310-1. The server list 602 may be generated by sending a request to operating server instances to return a list of processes that maintain a static connection to the first database 310-1. The server instances may respond with a list of processes or process IDs that hold current static connections to the first database 310-1. Thus, the server list 602 may identify individual processes on server instances that maintain a current static connection to the first database 310-1.

The server manager 402 may cycle through the server list 602 and send the second notification to any of the server instances that have processes connected to the first database 310-1. Thus, the second notification may be sent to a plurality of application servers. The second notification may cause threads that hold connections to the first database 310-1 to refresh the connection when those threads are idle. The second notification may cause these connections to be refreshed through direct messages to individual processes/kernels, or by specific instructions generated by the server instance.

In the example of FIG. 6, the second notification may be sent to a web server 306 and an application server 300, as each of these server instances may include a process/kernel that maintains a static connection to the first database 310-1. In some embodiments, the second notification may be addressed generally to the server instance and may cause the server instance to send individual messages to processes/kernels that have current connections to the first database 310-1. The server instance may receive a second notification 604 and generate individual messages to processes/kernels executing on the server instance. This allows the second notification 604 to be generic that is sent to the server instances, and allows the server instances to individually implement and generate instructions that cause processes/kernels to refresh their database connections.

Alternatively or additionally, the second notification may individually address processes/kernels at the server instances. For example, the server instance may receive second notifications from the server manager 402 for any processes/kernels currently executing that have a static connection to the first database 310-1. This allows the server instance to pass the second notification from the server manager 402 to the individual processes/kernels using the internal messaging system of the server instance. Therefore, no additional change may be necessary to the server instance itself, and the server manager 402 may take advantage of the inherent messaging service within each of the server instances.

Figure 7:
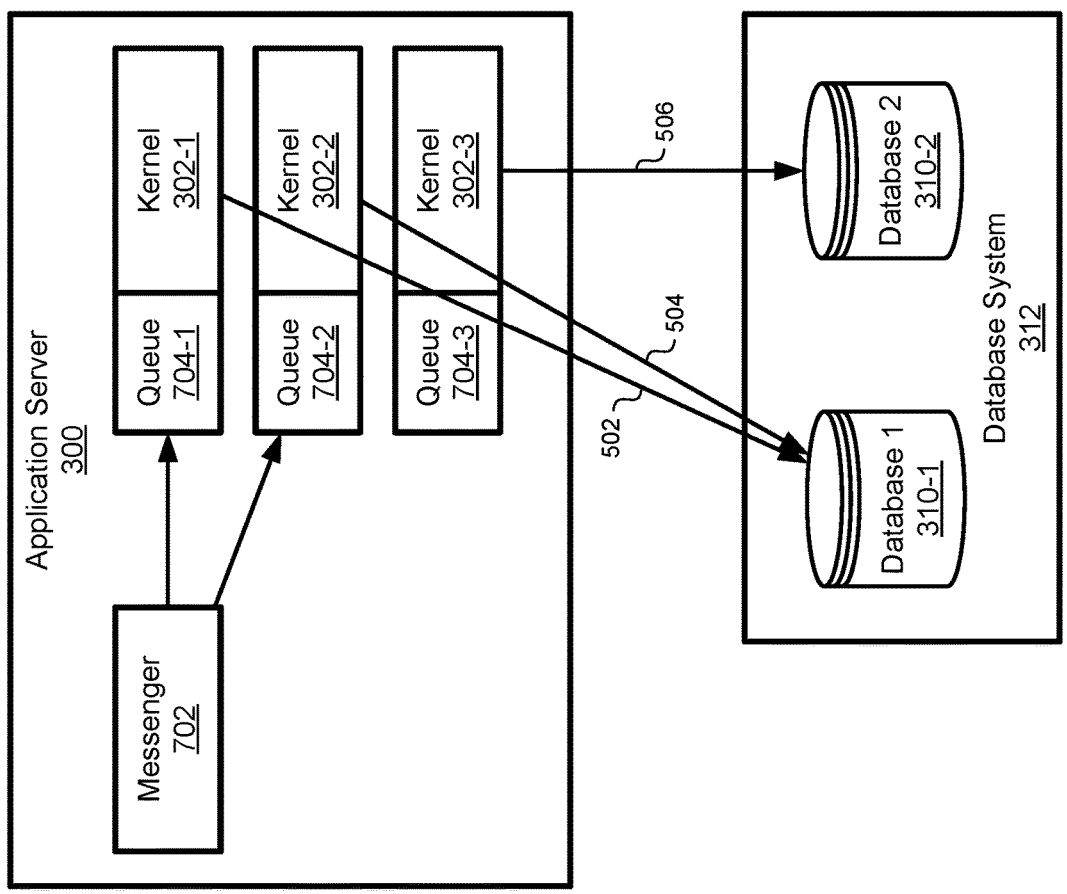
FIG. 7 illustrates how static connections to databases may be maintained by individual threads within a kernel or process, according to some embodiments.

FIG. 7 illustrates how static connections to databases may be maintained by individual threads within a kernel or process, according to some embodiments. This example shows a single server instance that is implemented as an application server 300. The application server 300 may implement an internal messaging service with a messenger 702 that sends and receives messages to the various kernels 302 in the application server 300. The messenger 702 may receive messages from one kernel and deliver those messages to another kernel. For example, the messenger 702 may receive a message from one kernel indicating that a job for a workload is completed and processing may begin on a new job for the workload at another kernel.

The messaging system of the server instance may be leveraged to refresh the static connections to the database system 312. For example, the messenger 702 may receive messages that are addressed to individual processes/kernels in the server instance. In this example, the messenger 702 may receive messages that are addressed individually to kernel 302-1 and kernel 302-2, as these two kernels currently hold static connections to the first database 310-1. The messenger 702 may receive messages that originate from the server manager 402, or the messenger 702 may receive messages that originate from a process on the application server 300 that generate the refresh messages in response to receiving the second notification from the server manager 402. The messenger 702 may submit these messages to queues 704 that hold messages for the individual kernels 302.

Figure 8:
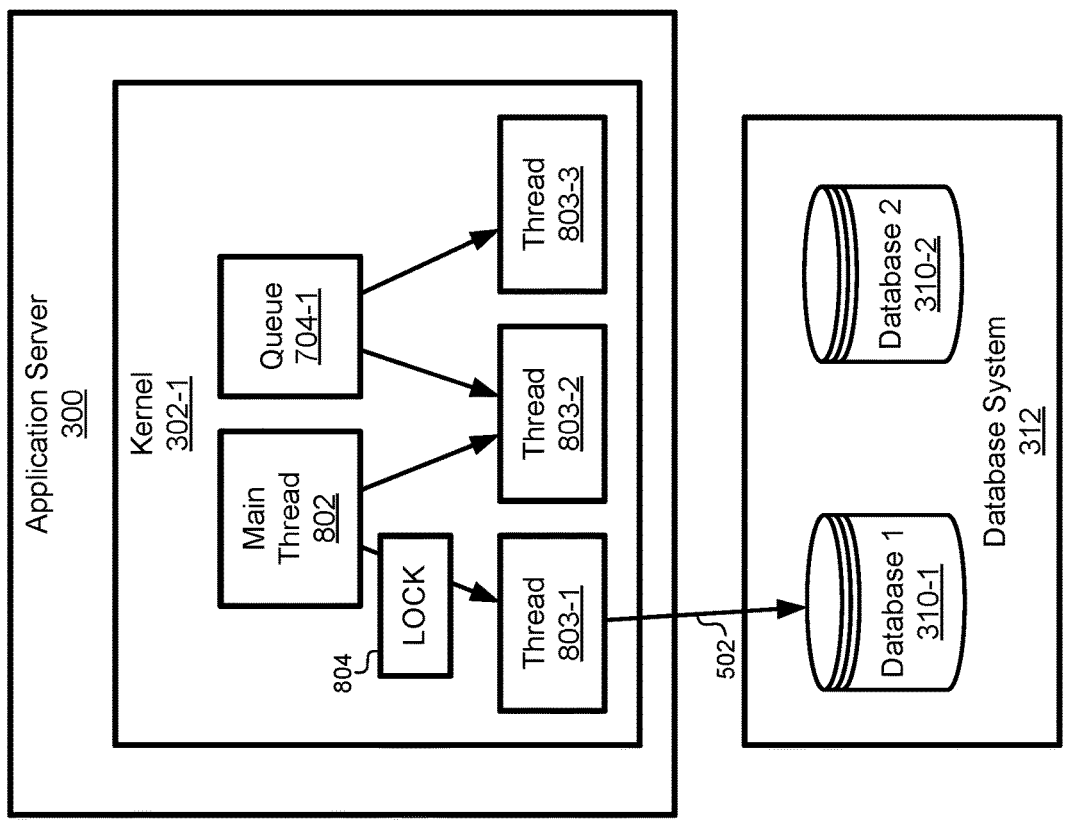
FIG. 8 illustrates how a main thread in a kernel may cause threads holding static connections to the first database to refresh the connection when the thread is idle, according to some embodiments.

FIG. 8 illustrates how a main thread in a kernel may cause threads holding static connections to the first database to refresh the connection when the thread is idle, according to some embodiments. As described above, a kernel 302-1 may be comprised of a number of threads 803. Each of the threads 803 may independently execute jobs that are part of a workload. Just as individual threads can hold locks on shared memory and/or shared files, the individual threads 803 may also maintain individual static connections to databases in the database system 312.

The kernel 302-1 may include a main thread 802. The main thread 802 may exercise control over the other threads 803. For example, the main thread 802 may control when the other threads 803 are allowed to retrieve messages from the queue 704-1. As new jobs are received and placed in the queue 704-1, the main thread 802 may place a lock 804 on a thread 803-1 that holds a connection 502 to the first database 310-1. The lock 804 may prevent the thread 803-1 from retrieving new messages from the queue 704-1. This allows the thread 803-1 to finish executing a current job, but prevents the thread 803-1 from retrieving a new job from the queue 704-1 until the lock 804 is removed.

Although only a single thread 803-1 has received a lock 804 in the example of FIG. 8, the main thread 802 may place additional locks on any other threads 803 that hold connections to the first database 310-1. Each of these locks may be administered individually such that each of the locked threads may continue executing until their respective jobs are completed. Locks may also be removed individually. For example, as the job executed by thread 803-1 is completed, the lock 804 may be removed from the thread 803-1 while other locks on other threads remain in place.

Figure 9:
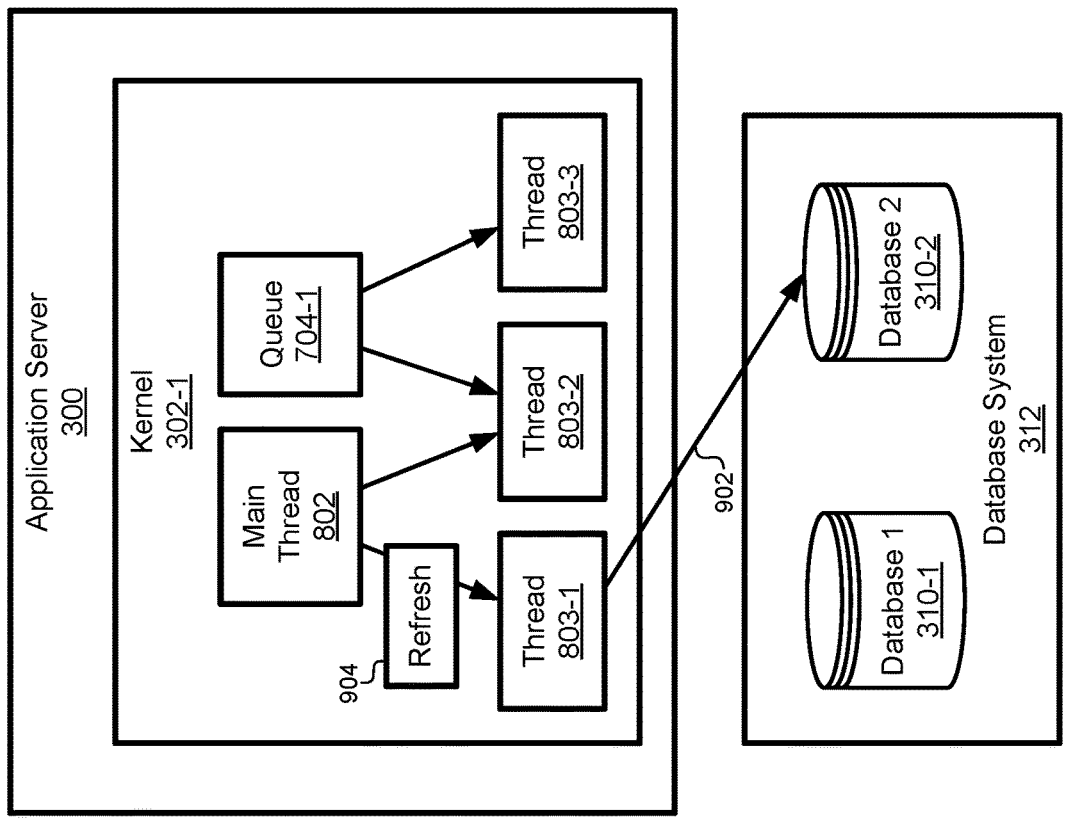
FIG. 9 illustrates how a thread can refresh a connection to the database system when it enters an idle state, according to some embodiments.

FIG. 9 illustrates how a thread can refresh a connection to the database system 312 when it enters an idle state, according to some embodiments. When the thread 803-1 finishes processing its current job, the thread 803-1 may enter an idle state or a "waiting" state as described above. The state may indicate that the thread 803-1 is not assigned to a current job, but rather is waiting to receive a job from the queue 704-1. When the main thread 802 detects that the thread 803-1 has entered the idle or waiting state, the main thread 802 may remove the lock 804 and allow the thread 803-1 to receive or retrieve the message 904 that causes the thread 803-1 to refresh its connection to the database system 312. The main thread 802 may cause the message 904 causing the refresh to be retrieved by the thread 803-1 before it retrieves any other jobs in the queue 704-1 that would otherwise be assigned to the thread 803-1. This ensures that the thread 803-1 refreshes its connection to the database system 312 as soon as entering the idle state for the first time after completing a current job execution.

In some embodiments, the message 904 may cause the thread 803-1 to send a new request to the database system 312 to refresh or establish a connection to the first database 310-1. As described above, the database system 312 has previously been instructed to redirect any request to connect to the first database 310-1 to instead connect to the second database 310-2. Thus, the thread 803-1 need not be made aware of any change to the routing of its request to the database system 312, and the redirection to the second database 310-2 may be transparent to the thread 803-1. Some embodiments may use a refresh command that requests that the database system 312 refresh the existing connection to the first database 310-1. In response, the database system 312 may instead shift a new connection to the second database 310-2. A refresh operation may require significantly less overhead than a request to create an entirely new connection. Alternatively, the message 904 may cause the thread 803-1 to perform a refresh by terminating the existing connection to the first database 310-1 and requesting a new connection.

Alternatively, the message 904 may specifically direct the thread 803-1 to send a message to the database system 312 that specifically establishes a connection to the second database 310-2. Because the server manager 402 knows that new connection requests will be rerouted from the first database 310-1 to the second database 310-2, the message 904 may be formulated to specifically request a connection to the second database 310-2.

Figure 10:
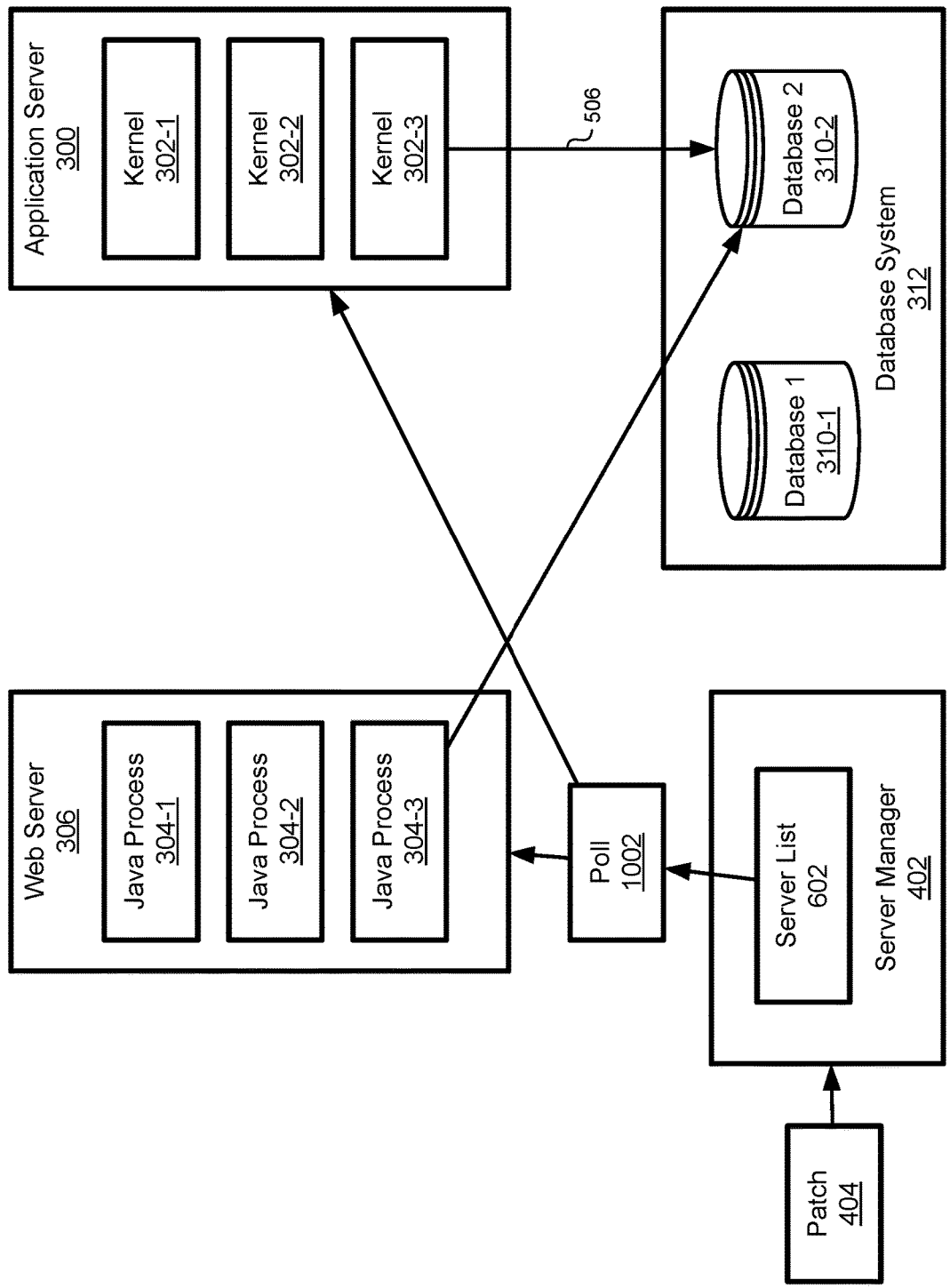
FIG. 10 illustrates how the system can determine that connections to the first database have been moved to the second database, according to some embodiments.

FIG. 10 illustrates how the system can determine that connections to the first database have been moved to the second database, according to some embodiments. At this stage, the server manager 402 may have passed the first notification to the database system to ensure that no additional connections are made to the first database 310-1. Additionally, the server manager 402 may have passed the second notification to the server instances ensuring that existing static connections to the first database 310-1 are refreshed to instead connect to the second database 310-2 as soon as the owning threads finish their current jobs and enter an idle state. Before the server manager 402 may initiate the patch or update to be applied to the first database 310-1, the server manager 402 may first determine that connections to the first database 310-1 have all been terminated and/or refreshed to the second database 210-2.

This determination may be made in a number of different ways. In some embodiments, the server manager 410 may send a polling message 1002 to the server instances in the operating environment. The server instances may respond with process/thread IDs that still maintain a static connection to the first database 310-1. When each of the server instances in the server list 602 respond with a null list or otherwise indicate that no active processes/threads hold current static connections to the first database 310-1, the server manager 402 may determine that any previous connections to the first database 310-1 have either been terminated or refreshed to instead point to the second database 310-2.

The server manager 402 may send the polling message 1002 at regular time intervals until there are no existing connections to the first database 310-1. For example, the polling message 1002 may be sent every 1 ms, every 50 ms, every 100 ms, every 500 ms, every 1 second, every 5 seconds, and so forth. The server manager 402 may also initiate a timeout interval that limits how many polling messages should be sent and/or how long the server manager 402 should wait. For example, if 1 minute elapses with connection still existing to the first database 310-1, the server manager 402 may restart the entire process, may resend the second notification, and/or may resend the polling message 1002. Alternatively, if more than one timeout interval expires, the server manager 402 may terminate the patching process and schedule a retry in the future.

Figure 11:
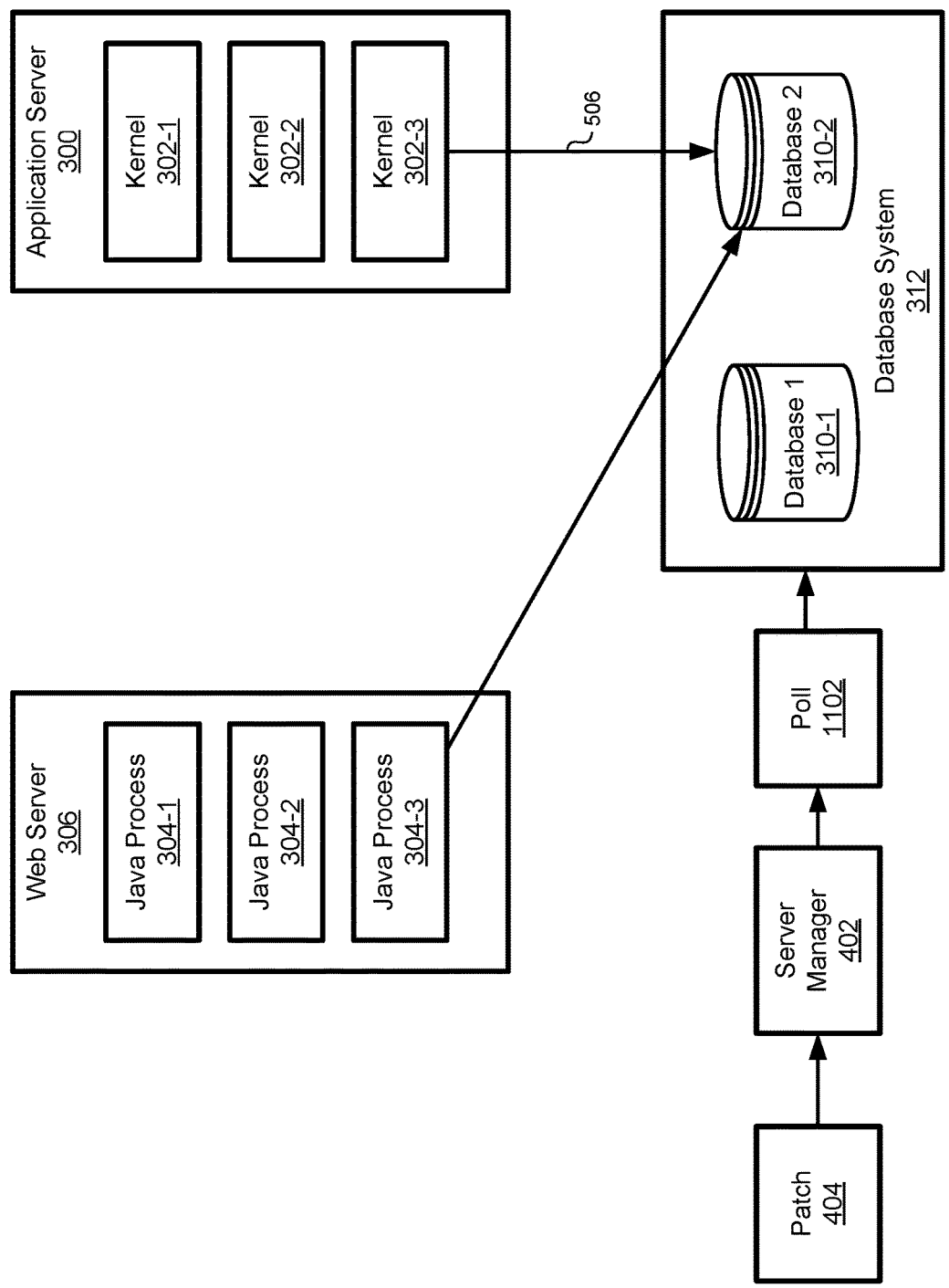
FIG. 11 illustrates how the server manager may rely on the database system to determine when the existing connections to the first database have been refreshed.

FIG. 11 illustrates how the server manager may rely on the database system 312 to determine when the existing connections to the first database 310-1 have been refreshed. Instead of polling the server instances to determine when the connections to the first database 310-1 have been refreshed, a polling message 1102 may instead be sent to the database system 312 itself. The database system 312 may report back to the server manager 402 with an indication of the number of connections to the first database 310-1 that still exist. As described above, the polling message 1102 may be sent at regular intervals until the database system 312 indicates that there are no longer any active data connections to the first database 310-1. The polling message 1102 may be sent repeatedly at regular time intervals as described above, and the polling message process may be subject to one or more timeout intervals as described above.

Figure 12:
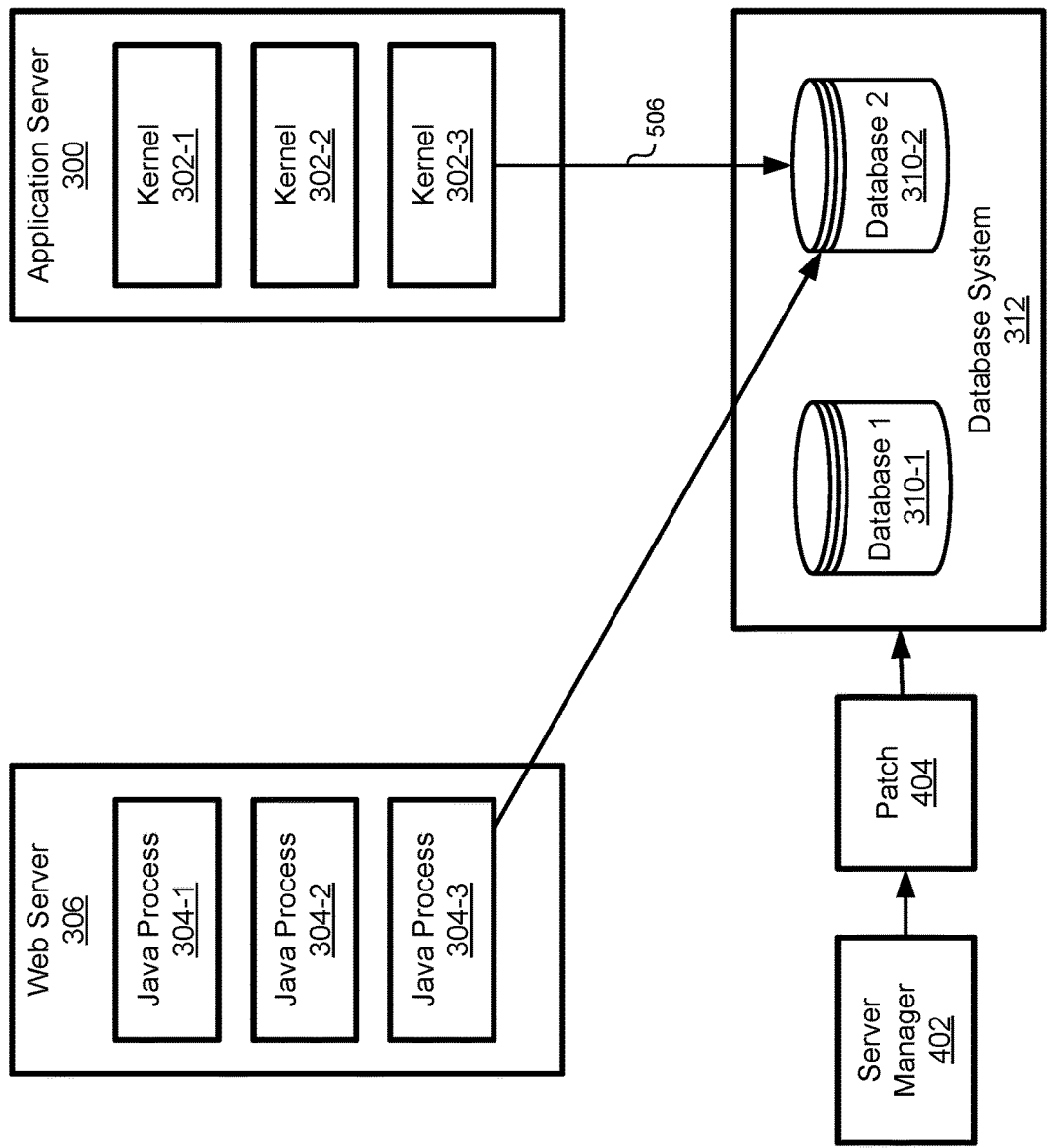
FIG. 12 illustrates how the patch may be applied to the first database after existing connections have been refreshed, according to some embodiments.

FIG. 12 illustrates how the patch 404 may be applied to the first database 310-1 after existing connections have been refreshed, according to some embodiments. As illustrated in this example, all of the previous connections to the first database 310-1 illustrated in FIG. 4 have either been terminated or refreshed such that they now point to the second database 310-2. Note that these connections may have been migrated incrementally as individual threads finished job executions and entered idle states. The database system prevented new connections from being made to the first database 310-1, and as soon the existing connections were refreshed, the first database 310-1 may be ready to receive the patch 404.

The patch 404 may include any change to the data, schema, metadata, structure, software, and/or hardware of the first database 310-1. This may include software upgrades, hardware upgrades, version upgrades, security patches, and/or the like. The system may directly cause the patch 404 to be applied to the first database 310-1. For example, the server manager 402 may apply the patch to the first database 310-1. Alternatively, a lifecycle management system may apply the patch 404, and/or the database system 312 may apply the patch. The server manager 402 may cause this action to take place by notifying the database system 312 and/or the lifecycle management system that the first database 310-1 is ready to receive the patch 404.

After receiving the patch 404, the database system 312 may continue to function with existing connections pointing to the second database 310-2. This may continue until a patch should be applied to the second database 310-2, at which point the same process described above may be carried out for the second database 310-2. Specifically, the server manager 402 may send a first notification to the database system 312 indicating that a patch is ready for the second database 310-2. The server manager 402 may then send a second notification to the server instances to cause connections between threads and the second database 310-2 to be refreshed to instead point to the first database 310-1.

Alternatively, when the patch 404 has been applied to the first database 310-1, the database system 312 may initiate an affirmative transition back to the first database 310-1. For example, the server manager 402 may receive a notification from the database system 312 that the patch 404 has been applied in the process is complete. In response, the server manager 402 may send first and/or second notifications as described above to prevent new static connections from being made to the second database 310-2 and to refresh existing connections back to the first database 310-1.

In some embodiments, the first notification may be sent without the second notification after the patching process is complete, and vice versa. For example, the server manager 402 may send the first notification to prevent new static connections from being made to the second database 310-2, and the existing connections may be allowed to timeout naturally. Alternatively, the server manager 402 may send the second notification to refresh any existing connections to the second database 310-2 back to the first database 310-1, while allowing new connections to be made explicitly to the second database 310-2 without restriction. Either of these options may reduce the overhead of switching back to the first database 310-1. To distinguish subsequent first/second notifications, these may be instead be referred to as third/fourth notifications, respectively.

Figure 13:
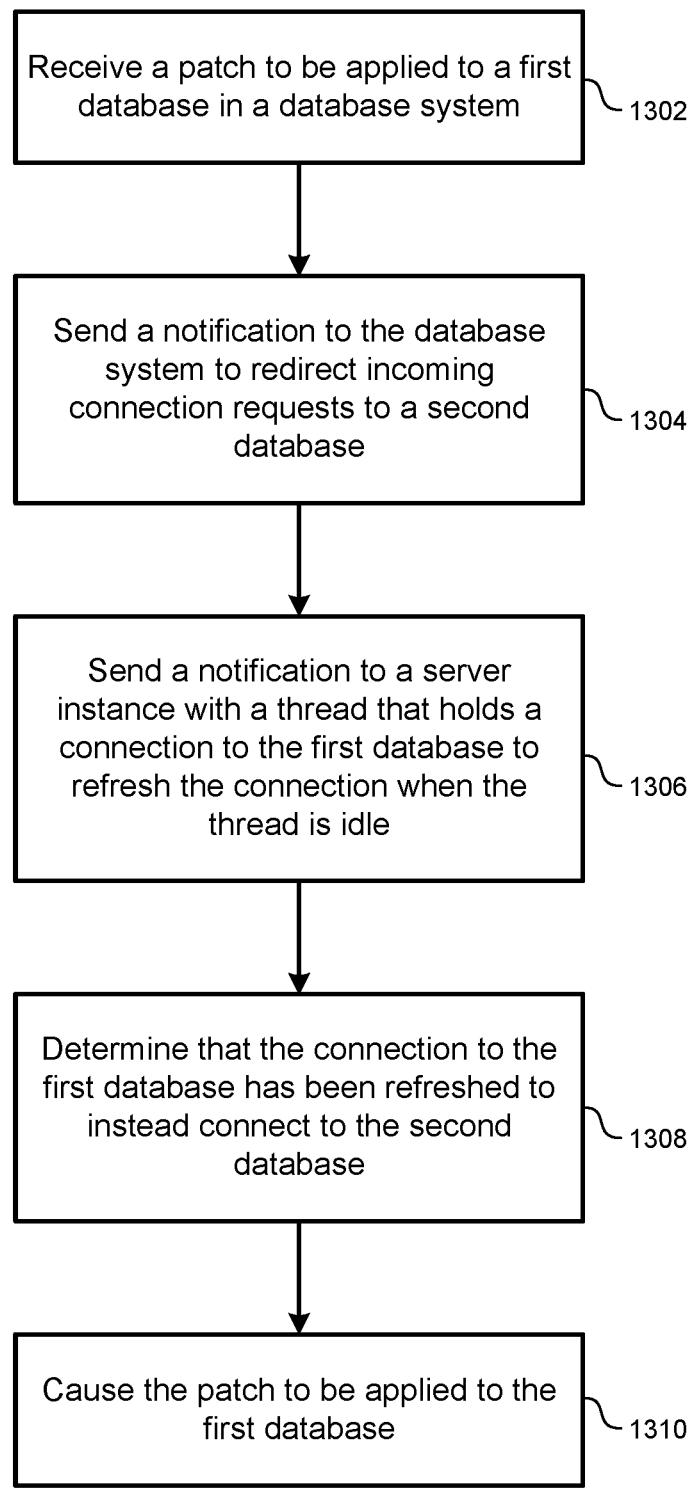
FIG. 13 illustrates a flowchart of a method for applying patches to databases that maintain static connections to threads in multiple server instances, according to some embodiments.

FIG. 13 illustrates a flowchart of a method for applying patches to databases that maintain static connections to threads in multiple server instances, according to some embodiments. This method may be executed by an operating environment in which multiple server instances exist. This method may be carried out by any process that is in or associated with the operating environment. In some implementations, the process may be carried out by a server manager as described above. The operating environment may include a plurality of server instances, including web servers, application servers, and other servers that include processes, kernels, and threads using any of the features described above in FIGS. 1-3 and throughout this specification.

The method may include receiving a patch to be applied to a first database in a database system (1302). The database system may also include a second database in addition to the first database. The second database may include a mirror copy of the first database. The second database may also include a plurality of databases that together provide the mirror copy of the first database. The patch may include any change to the hardware and/or software of the first database. The database system may include a plurality of different databases that provide redundant storage for data accessed by the application servers. The patch may be received using any of the features described above in FIG. 4 and throughout this specification.

The method may additionally include sending a first notification to the database system that causes the database system to redirect incoming connection requests for the first database to a second database (1304). The first notification may prevent the database system from allowing new static connections to the first database. The first notification may also cause new requests for connections to the first database to be automatically rerouted to the second database. This process may be transparent to threads operating on the application servers. This first notification may be sent using any of the features as described above in FIGS. 4-5 and throughout this specification.

The method may further include sending a second notification to a server instance (1306). The server instance may include a thread that holds a connection to the first database. The second notification may cause the thread to refresh the connection when the thread is idle. Additionally, the second notification may be sent to multiple server instances, and each server instance may route the second notification or a message based on the second notification to a plurality of threads and/or processes executing on those server instances. Threads currently using a static connection to the first database that are executing jobs may be allowed to finish executing those jobs and enter an idle state before they retrieve a message from a message queue that causes them to refresh the connection to the first database to instead include a connection to the second database. This second notification may be sent and processed using any of the features described above in FIGS. 6-9 and throughout this specification.

The method may also include determining that the connection to the first database has been refreshed such that the thread is instead connected to the second database (1308). This determination may be made by polling the server instances at regular time intervals until the server instances indicate that the existing connections to the first database have been refreshed to instead point to the second database. This determination may also be made by polling the database system itself at regular intervals until the database system indicates that no static connections to the first database remain active. This determination may be limited by one or more timeout intervals, after which the process may be restarted, reset, or canceled. This process may be carried out using any of the features described above in FIGS. 10-11 and throughout this specification.

The method may additionally include causing the patch to be applied to the first database in response to determining that the connection to the first database has been refreshed (1310). The patch may be applied by the server manager, by the operating environment, and/or by a lifecycle management system. After the patch has been applied, the database system may transition the connections to the second database back to the first database. This transition may be done as part of an upgrade or patch to the second database. This transition may also be done immediately by sending first and/or second notifications. This process may be carried out using any of the features described above in FIG. 12 and throughout the specification.

It should be appreciated that the specific steps illustrated in FIG. 13 provide particular methods of identifying dependencies between call stacks and server instances according to various embodiments. Other sequences of steps may also be performed according to alternative embodiments. For example, alternative embodiments may perform the steps outlined above in a different order. Moreover, the individual steps illustrated in FIG. 13 may include multiple sub-steps that may be performed in various sequences as appropriate to the individual step. Furthermore, additional steps may be added or removed depending on the particular applications. Many variations, modifications, and alternatives also fall within the scope of this disclosure.

Each of the methods described herein may be implemented by a computer system. Each step of these methods may be executed automatically by the computer system, and/or may be provided with inputs/outputs involving a user. For example, a user may provide inputs for each step in a method, and each of these inputs may be in response to a specific output requesting such an input, wherein the output is generated by the computer system. Each input may be received in response to a corresponding requesting output. Furthermore, inputs may be received from a user, from another computer system as a data stream, retrieved from a memory location, retrieved over a network, requested from a web service, and/or the like. Likewise, outputs may be provided to a user, to another computer system as a data stream, saved in a memory location, sent over a network, provided to a web service, and/or the like. In short, each step of the methods described herein may be performed by a computer system, and may involve any number of inputs, outputs, and/or requests to and from the computer system which may or may not involve a user. Those steps not involving a user may be said to be performed automatically by the computer system without human intervention. Therefore, it will be understood in light of this disclosure, that each step of each method described herein may be altered to include an input and output to and from a user, or may be done automatically by a computer system without human intervention where any determinations are made by a processor. Furthermore, some embodiments of each of the methods described herein may be implemented as a set of instructions stored on a tangible, non-transitory storage medium to form a tangible software product.

Figure 14:
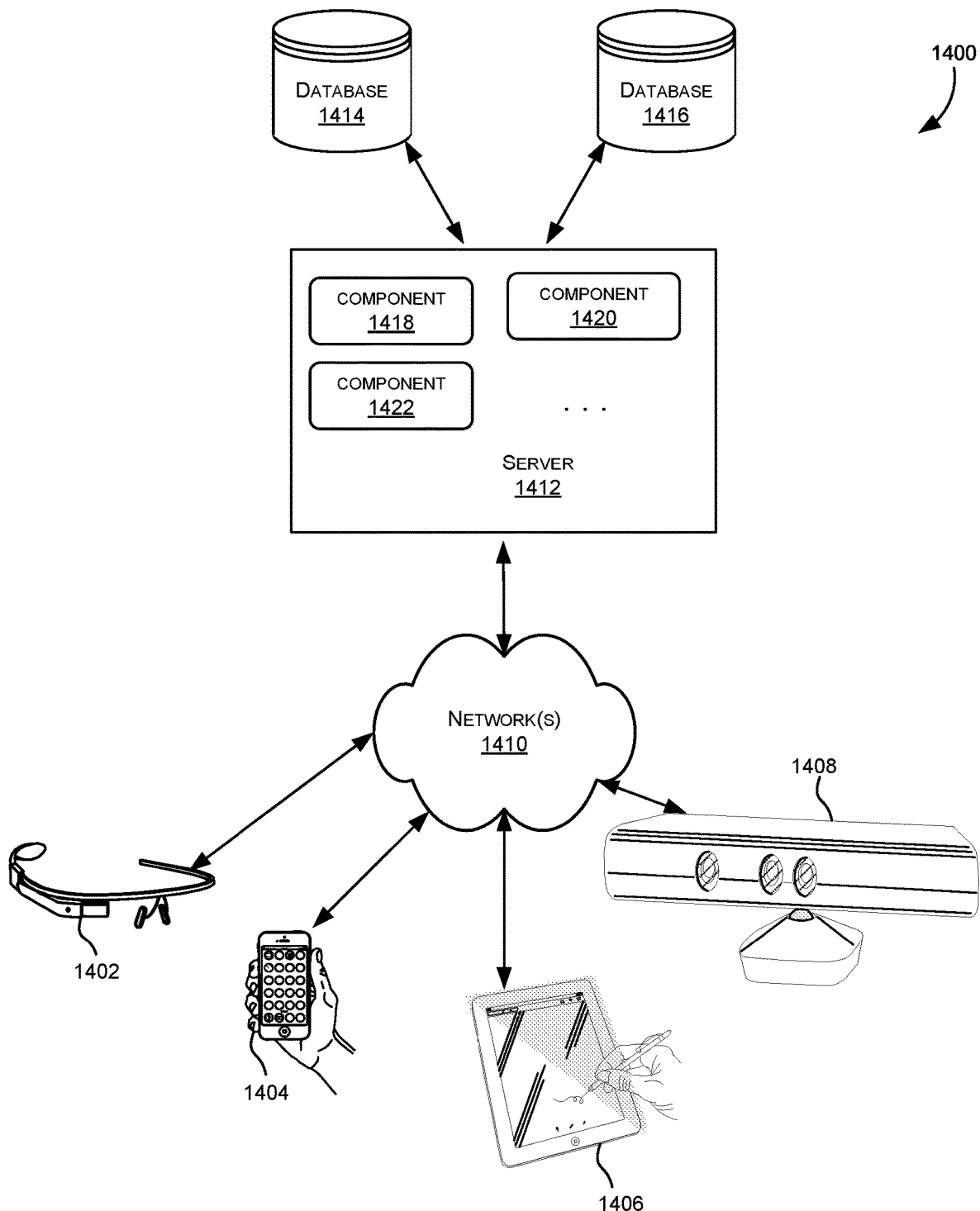
FIG. 14 illustrates a simplified block diagram of a distributed system for implementing some of the embodiments.

FIG. 14 depicts a simplified diagram of a distributed system 1400 for implementing one of the embodiments. In the illustrated embodiment, distributed system 1400 includes one or more client computing devices 1402, 1404, 1406, and 1408, which are configured to execute and operate a client application such as a web browser, proprietary client (e.g., Oracle Forms), or the like over one or more network(s) 1410. Server 1412 may be communicatively coupled with remote client computing devices 1402, 1404, 1406, and 1408 via network 1410.

In various embodiments, server 1412 may be adapted to run one or more services or software applications provided by one or more of the components of the system. In some embodiments, these services may be offered as web-based or cloud services or under a Software as a Service (SaaS) model to the users of client computing devices 1402, 1404, 1406, and/or 1408. Users operating client computing devices 1402, 1404, 1406, and/or 1408 may in turn utilize one or more client applications to interact with server 1412 to utilize the services provided by these components.

In the configuration depicted in the figure, the software components 1418, 1420 and 1422 of system 1400 are shown as being implemented on server 1412. In other embodiments, one or more of the components of system 1400 and/or the services provided by these components may also be implemented by one or more of the client computing devices 1402, 1404, 1406, and/or 1408. Users operating the client computing devices may then utilize one or more client applications to use the services provided by these components. These components may be implemented in hardware, firmware, software, or combinations thereof. It should be appreciated that various different system configurations are possible, which may be different from distributed system 1400. The embodiment shown in the figure is thus one example of a distributed system for implementing an embodiment system and is not intended to be limiting.

Client computing devices 1402, 1404, 1406, and/or 1408 may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 10, Palm OS, and the like, and being Internet, e-mail, short message service (SMS), Blackberry®, or other communication protocol enabled. The client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices 1402, 1404, 1406, and 1408 may be any other electronic device, such as a thin-client computer, an Internet-enabled gaming system (e.g., a Microsoft Xbox gaming console with or without a Kinect® gesture input device), and/or a personal messaging device, capable of communicating over network(s) 1410.

Although exemplary distributed system 1400 is shown with four client computing devices, any number of client computing devices may be supported. Other devices, such as devices with sensors, etc., may interact with server 1412.

Network(s) 1410 in distributed system 1400 may be any type of network that can support data communications using any of a variety of commercially-available protocols, including without limitation TCP/IP (transmission control protocol/Internet protocol), SNA (systems network architecture), IPX (Internet packet exchange), AppleTalk, and the like. Merely by way of example, network(s) 1410 can be a local area network (LAN), such as one based on Ethernet, Token-Ring and/or the like. Network(s) 1410 can be a wide-area network and the Internet. It can include a virtual network, including without limitation a virtual private network (VPN), an intranet, an extranet, a public switched telephone network (PSTN), an infra-red network, a wireless network (e.g., a network operating under any of the Institute of Electrical and Electronics (IEEE) 802.11 suite of protocols, Bluetooth®, and/or any other wireless protocol); and/or any combination of these and/or other networks.

Server 1412 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. In various embodiments, server 1412 may be adapted to run one or more services or software applications described in the foregoing disclosure. For example, server 1412 may correspond to a server for performing processing described above according to an embodiment of the present disclosure.

Server 1412 may run an operating system including any of those discussed above, as well as any commercially available server operating system. Server 1412 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle, Microsoft, Sybase, IBM (International Business Machines), and the like.

In some implementations, server 1412 may include one or more applications to analyze and consolidate data feeds and/or event updates received from users of client computing devices 1402, 1404, 1406, and 1408. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. Server 1412 may also include one or more applications to display the data feeds and/or real-time events via one or more display devices of client computing devices 1402, 1404, 1406, and 1408.

Distributed system 1400 may also include one or more databases 1414 and 1416. Databases 1414 and 1416 may reside in a variety of locations. By way of example, one or more of databases 1414 and 1416 may reside on a non-transitory storage medium local to (and/or resident in) server 1412. Alternatively, databases 1414 and 1416 may be remote from server 1412 and in communication with server 1412 via a network-based or dedicated connection. In one set of embodiments, databases 1414 and 1416 may reside in a storage-area network (SAN). Similarly, any necessary files for performing the functions attributed to server 1412 may be stored locally on server 1412 and/or remotely, as appropriate. In one set of embodiments, databases 1414 and 1416 may include relational databases, such as databases provided by Oracle, that are adapted to store, update, and retrieve data in response to SQL-formatted commands.

Figure 15:
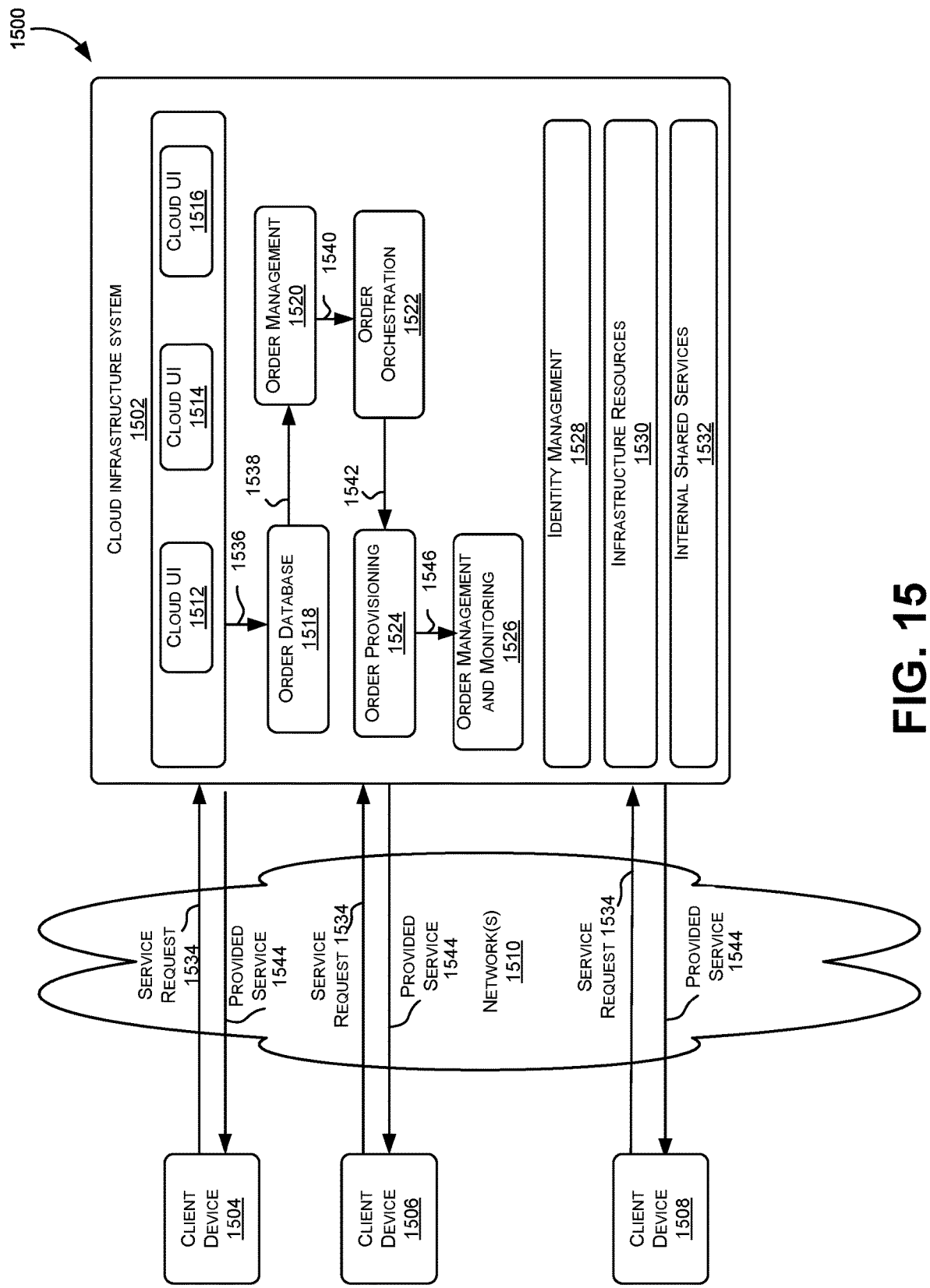
FIG. 15 illustrates a simplified block diagram of components of a system environment by which services provided by the components of an embodiment system may be offered as cloud services.

FIG. 15 is a simplified block diagram of one or more components of a system environment 1500 by which services provided by one or more components of an embodiment system may be offered as cloud services, in accordance with an embodiment of the present disclosure. In the illustrated embodiment, system environment 1500 includes one or more client computing devices 1504, 1506, and 1508 that may be used by users to interact with a cloud infrastructure system 1502 that provides cloud services. The client computing devices may be configured to operate a client application such as a web browser, a proprietary client application (e.g., Oracle Forms), or some other application, which may be used by a user of the client computing device to interact with cloud infrastructure system 1502 to use services provided by cloud infrastructure system 1502.

It should be appreciated that cloud infrastructure system 1502 depicted in the figure may have other components than those depicted. Further, the system shown in the figure is only one example of a cloud infrastructure system that may incorporate some embodiments. In some other embodiments, cloud infrastructure system 1502 may have more or fewer components than shown in the figure, may combine two or more components, or may have a different configuration or arrangement of components.

Client computing devices 1504, 1506, and 1508 may be devices similar to those described above for 1402, 1404, 1406, and 1408.

Although exemplary system environment 1500 is shown with three client computing devices, any number of client computing devices may be supported. Other devices such as devices with sensors, etc. may interact with cloud infrastructure system 1502.

Network(s) 1510 may facilitate communications and exchange of data between clients 1504, 1506, and 1508 and cloud infrastructure system 1502. Each network may be any type of network that can support data communications using any of a variety of commercially-available protocols, including those described above for network(s) 1410.

Cloud infrastructure system 1502 may comprise one or more computers and/or servers that may include those described above for server 1412.

In certain embodiments, services provided by the cloud infrastructure system may include a host of services that are made available to users of the cloud infrastructure system on demand, such as online data storage and backup solutions, web-based e-mail services, hosted office suites and document collaboration services, database processing, managed technical support services, and the like. Services provided by the cloud infrastructure system can dynamically scale to meet the needs of its users. A specific instantiation of a service provided by cloud infrastructure system is referred to herein as a "service instance." In general, any service made available to a user via a communication network, such as the Internet, from a cloud service provider's system is referred to as a "cloud service." Typically, in a public cloud environment, servers and systems that make up the cloud service provider's system are different from the customer's own on-premises servers and systems. For example, a cloud service provider's system may host an application, and a user may, via a communication network such as the Internet, on demand, order and use the application.

In some examples, a service in a computer network cloud infrastructure may include protected computer network access to storage, a hosted database, a hosted web server, a software application, or other service provided by a cloud vendor to a user. For example, a service can include password-protected access to remote storage on the cloud through the Internet. As another example, a service can include a web service-based hosted relational database and a script-language middleware engine for private use by a networked developer. As another example, a service can include access to an email software application hosted on a cloud vendor's web site.

In certain embodiments, cloud infrastructure system 1502 may include a suite of applications, middleware, and database service offerings that are delivered to a customer in a self-service, subscription-based, elastically scalable, reliable, highly available, and secure manner. An example of such a cloud infrastructure system is the Oracle Public Cloud provided by the present assignee.

In various embodiments, cloud infrastructure system 1502 may be adapted to automatically provision, manage and track a customer's subscription to services offered by cloud infrastructure system 1502. Cloud infrastructure system 1502 may provide the cloud services via different deployment models. For example, services may be provided under a public cloud model in which cloud infrastructure system 1502 is owned by an organization selling cloud services (e.g., owned by Oracle) and the services are made available to the general public or different industry enterprises. As another example, services may be provided under a private cloud model in which cloud infrastructure system 1502 is operated solely for a single organization and may provide services for one or more entities within the organization. The cloud services may also be provided under a community cloud model in which cloud infrastructure system 1502 and the services provided by cloud infrastructure system 1502 are shared by several organizations in a related community. The cloud services may also be provided under a hybrid cloud model, which is a combination of two or more different models.

In some embodiments, the services provided by cloud infrastructure system 1502 may include one or more services provided under Software as a Service (SaaS) category, Platform as a Service (PaaS) category, Infrastructure as a Service (IaaS) category, or other categories of services including hybrid services. A customer, via a subscription order, may order one or more services provided by cloud infrastructure system 1502. Cloud infrastructure system 1502 then performs processing to provide the services in the customer's subscription order.

In some embodiments, the services provided by cloud infrastructure system 1502 may include, without limitation, application services, platform services and infrastructure services. In some examples, application services may be provided by the cloud infrastructure system via a SaaS platform. The SaaS platform may be configured to provide cloud services that fall under the SaaS category. For example, the SaaS platform may provide capabilities to build and deliver a suite of on-demand applications on an integrated development and deployment platform. The SaaS platform may manage and control the underlying software and infrastructure for providing the SaaS services. By utilizing the services provided by the SaaS platform, customers can utilize applications executing on the cloud infrastructure system. Customers can acquire the application services without the need for customers to purchase separate licenses and support. Various different SaaS services may be provided. Examples include, without limitation, services that provide solutions for sales performance management, enterprise integration, and business flexibility for large organizations.

In some embodiments, platform services may be provided by the cloud infrastructure system via a PaaS platform. The PaaS platform may be configured to provide cloud services that fall under the PaaS category. Examples of platform services may include without limitation services that enable organizations (such as Oracle) to consolidate existing applications on a shared, common architecture, as well as the ability to build new applications that leverage the shared services provided by the platform. The PaaS platform may manage and control the underlying software and infrastructure for providing the PaaS services. Customers can acquire the PaaS services provided by the cloud infrastructure system without the need for customers to purchase separate licenses and support. Examples of platform services include, without limitation, Oracle Java Cloud Service (JCS), Oracle Database Cloud Service (DBCS), and others.

By utilizing the services provided by the PaaS platform, customers can employ programming languages and tools supported by the cloud infrastructure system and also control the deployed services. In some embodiments, platform services provided by the cloud infrastructure system may include database cloud services, middleware cloud services (e.g., Oracle Fusion Middleware services), and Java cloud services. In one embodiment, database cloud services may support shared service deployment models that enable organizations to pool database resources and offer customers a Database as a Service in the form of a database cloud. Middleware cloud services may provide a platform for customers to develop and deploy various business applications, and Java cloud services may provide a platform for customers to deploy Java applications, in the cloud infrastructure system.

Various different infrastructure services may be provided by an IaaS platform in the cloud infrastructure system. The infrastructure services facilitate the management and control of the underlying computing resources, such as storage, networks, and other fundamental computing resources for customers utilizing services provided by the SaaS platform and the PaaS platform.

In certain embodiments, cloud infrastructure system 1502 may also include infrastructure resources 1530 for providing the resources used to provide various services to customers of the cloud infrastructure system. In one embodiment, infrastructure resources 1530 may include pre-integrated and optimized combinations of hardware, such as servers, storage, and networking resources to execute the services provided by the PaaS platform and the SaaS platform.

In some embodiments, resources in cloud infrastructure system 1502 may be shared by multiple users and dynamically re-allocated per demand. Additionally, resources may be allocated to users in different time zones. For example, cloud infrastructure system 1530 may enable a first set of users in a first time zone to utilize resources of the cloud infrastructure system for a specified number of hours and then enable the re-allocation of the same resources to another set of users located in a different time zone, thereby maximizing the utilization of resources.

In certain embodiments, a number of internal shared services 1532 may be provided that are shared by different components or modules of cloud infrastructure system 1502 and by the services provided by cloud infrastructure system 1502. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

In certain embodiments, cloud infrastructure system 1502 may provide comprehensive management of cloud services (e.g., SaaS, PaaS, and IaaS services) in the cloud infrastructure system. In one embodiment, cloud management functionality may include capabilities for provisioning, managing and tracking a customer's subscription received by cloud infrastructure system 1502, and the like.

In one embodiment, as depicted in the figure, cloud management functionality may be provided by one or more modules, such as an order management module 1520, an order orchestration module 1522, an order provisioning module 1524, an order management and monitoring module 1526, and an identity management module 1528. These modules may include or be provided using one or more computers and/or servers, which may be general purpose computers, specialized server computers, server farms, server clusters, or any other appropriate arrangement and/or combination.

In exemplary operation 1534, a customer using a client device, such as client device 1504, 1506 or 1508, may interact with cloud infrastructure system 1502 by requesting one or more services provided by cloud infrastructure system 1502 and placing an order for a subscription for one or more services offered by cloud infrastructure system 1502. In certain embodiments, the customer may access a cloud User Interface (UI), cloud UI 1512, cloud UI 1514 and/or cloud UI 1516 and place a subscription order via these UIs. The order information received by cloud infrastructure system 1502 in response to the customer placing an order may include information identifying the customer and one or more services offered by the cloud infrastructure system 1502 that the customer intends to subscribe to.

After an order has been placed by the customer, the order information is received via the cloud UIs, 1512, 1514 and/or 1516.

At operation 1536, the order is stored in order database 1518. Order database 1518 can be one of several databases operated by cloud infrastructure system 1518 and operated in conjunction with other system elements.

At operation 1538, the order information is forwarded to an order management module 1520. In some instances, order management module 1520 may be configured to perform billing and accounting functions related to the order, such as verifying the order, and upon verification, booking the order.

At operation 1540, information regarding the order is communicated to an order orchestration module 1522. Order orchestration module 1522 may utilize the order information to orchestrate the provisioning of services and resources for the order placed by the customer. In some instances, order orchestration module 1522 may orchestrate the provisioning of resources to support the subscribed services using the services of order provisioning module 1524.

In certain embodiments, order orchestration module 1522 enables the management of business processes associated with each order and applies business logic to determine whether an order should proceed to provisioning. At operation 1542, upon receiving an order for a new subscription, order orchestration module 1522 sends a request to order provisioning module 1524 to allocate resources and configure those resources needed to fulfill the subscription order. Order provisioning module 1524 enables the allocation of resources for the services ordered by the customer. Order provisioning module 1524 provides a level of abstraction between the cloud services provided by cloud infrastructure system 1500 and the physical implementation layer that is used to provision the resources for providing the requested services. Order orchestration module 1522 may thus be isolated from implementation details, such as whether or not services and resources are actually provisioned on the fly or pre-provisioned and only allocated/assigned upon request.

At operation 1544, once the services and resources are provisioned, a notification of the provided service may be sent to customers on client devices 1504, 1506 and/or 1508 by order provisioning module 1524 of cloud infrastructure system 1502.

At operation 1546, the customer's subscription order may be managed and tracked by an order management and monitoring module 1526. In some instances, order management and monitoring module 1526 may be configured to collect usage statistics for the services in the subscription order, such as the amount of storage used, the amount data transferred, the number of users, and the amount of system up time and system down time.

In certain embodiments, cloud infrastructure system 1500 may include an identity management module 1528. Identity management module 1528 may be configured to provide identity services, such as access management and authorization services in cloud infrastructure system 1500. In some embodiments, identity management module 1528 may control information about customers who wish to utilize the services provided by cloud infrastructure system 1502. Such information can include information that authenticates the identities of such customers and information that describes which actions those customers are authorized to perform relative to various system resources (e.g., files, directories, applications, communication ports, memory segments, etc.) Identity management module 1528 may also include the management of descriptive information about each customer and about how and by whom that descriptive information can be accessed and modified.

Figure 16:
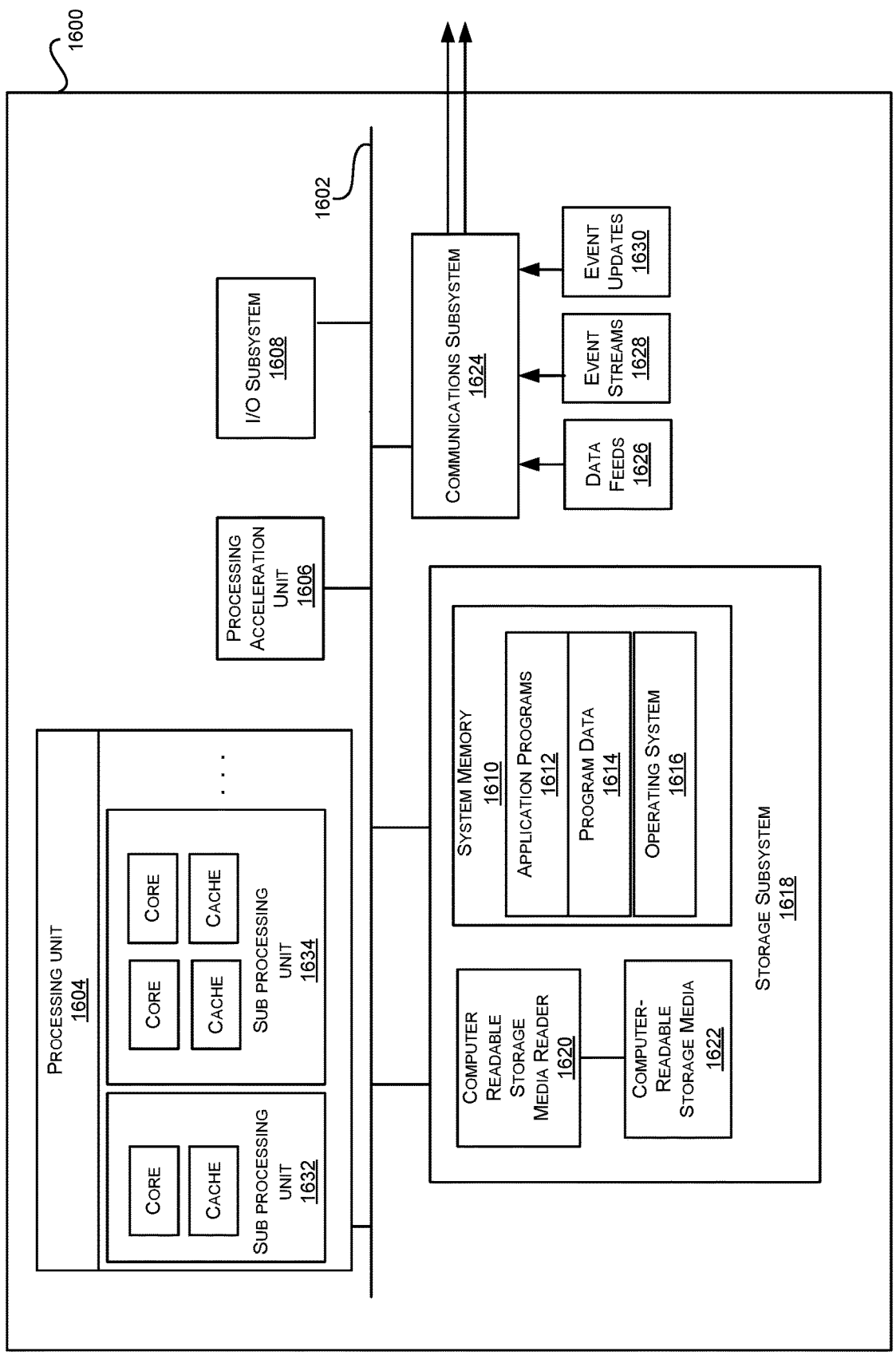
FIG. 16 illustrates an exemplary computer system, in which various embodiments may be implemented.

FIG. 16 illustrates an exemplary computer system 1600, in which various embodiments may be implemented. The system 1600 may be used to implement any of the computer systems described above. As shown in the figure, computer system 1600 includes a processing unit 1604 that communicates with a number of peripheral subsystems via a bus subsystem 1602. These peripheral subsystems may include a processing acceleration unit 1606, an I/O subsystem 1608, a storage subsystem 1618 and a communications subsystem 1624. Storage subsystem 1618 includes tangible computer-readable storage media 1622 and a system memory 1610.

Bus subsystem 1602 provides a mechanism for letting the various components and subsystems of computer system 1600 communicate with each other as intended. Although bus subsystem 1602 is shown schematically as a single bus, alternative embodiments of the bus subsystem may utilize multiple buses. Bus subsystem 1602 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 1604, which can be implemented as one or more integrated circuits (e.g., a conventional microprocessor or microcontroller), controls the operation of computer system 1600. One or more processors may be included in processing unit 1604. These processors may include single core or multicore processors. In certain embodiments, processing unit 1604 may be implemented as one or more independent processing units 1632 and/or 1634 with single or multicore processors included in each processing unit. In other embodiments, processing unit 1604 may also be implemented as a quad-core processing unit formed by integrating two dual-core processors into a single chip.

In various embodiments, processing unit 1604 can execute a variety of programs in response to program code and can maintain multiple concurrently executing programs or processes. At any given time, some or all of the program code to be executed can be resident in processor(s) 1604 and/or in storage subsystem 1618. Through suitable programming, processor(s) 1604 can provide various functionalities described above. Computer system 1600 may additionally include a processing acceleration unit 1606, which can include a digital signal processor (DSP), a special-purpose processor, and/or the like.

I/O subsystem 1608 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 1600 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 1600 may comprise a storage subsystem 1618 that comprises software elements, shown as being currently located within a system memory 1610. System memory 1610 may store program instructions that are loadable and executable on processing unit 1604, as well as data generated during the execution of these programs.

Depending on the configuration and type of computer system 1600, system memory 1610 may be volatile (such as random access memory (RAM)) and/or non-volatile (such as read-only memory (ROM), flash memory, etc.) The RAM typically contains data and/or program modules that are immediately accessible to and/or presently being operated and executed by processing unit 1604. In some implementations, system memory 1610 may include multiple different types of memory, such as static random access memory (SRAM) or dynamic random access memory (DRAM). In some implementations, a basic input/output system (BIOS), containing the basic routines that help to transfer information between elements within computer system 1600, such as during start-up, may typically be stored in the ROM. By way of example, and not limitation, system memory 1610 also illustrates application programs 1612, which may include client applications, web browsers, mid-tier applications, relational database management systems (RDBMS), etc., program data 1614, and an operating system 1616. By way of example, operating system 1616 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 10 OS, and Palm® OS operating systems.

Storage subsystem 1618 may also provide a tangible computer-readable storage medium for storing the basic programming and data constructs that provide the functionality of some embodiments. Software (programs, code modules, instructions) that when executed by a processor provide the functionality described above may be stored in storage subsystem 1618. These software modules or instructions may be executed by processing unit 1604. Storage subsystem 1618 may also provide a repository for storing data used in accordance with some embodiments.

Storage subsystem 1600 may also include a computer-readable storage media reader 1620 that can further be connected to computer-readable storage media 1622. Together and, optionally, in combination with system memory 1610, computer-readable storage media 1622 may comprehensively represent remote, local, fixed, and/or removable storage devices plus storage media for temporarily and/or more permanently containing, storing, transmitting, and retrieving computer-readable information.

Computer-readable storage media 1622 containing code, or portions of code, can also include any appropriate media, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computing system 1600.

By way of example, computer-readable storage media 1622 may include a hard disk drive that reads from or writes to non-removable, nonvolatile magnetic media, a magnetic disk drive that reads from or writes to a removable, nonvolatile magnetic disk, and an optical disk drive that reads from or writes to a removable, nonvolatile optical disk such as a CD ROM, DVD, and Blu-Ray® disk, or other optical media. Computer-readable storage media 1622 may include, but is not limited to, Zip® drives, flash memory cards, universal serial bus (USB) flash drives, secure digital (SD) cards, DVD disks, digital video tape, and the like. Computer-readable storage media 1622 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 1600.

Communications subsystem 1624 provides an interface to other computer systems and networks. Communications subsystem 1624 serves as an interface for receiving data from and transmitting data to other systems from computer system 1600. For example, communications subsystem 1624 may enable computer system 1600 to connect to one or more devices via the Internet. In some embodiments communications subsystem 1624 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 1624 can provide wired network connectivity (e.g., Ethernet) in addition to or instead of a wireless interface.

In some embodiments, communications subsystem 1624 may also receive input communication in the form of structured and/or unstructured data feeds 1626, event streams 1628, event updates 1630, and the like on behalf of one or more users who may use computer system 1600.

By way of example, communications subsystem 1624 may be configured to receive data feeds 1626 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 1624 may also be configured to receive data in the form of continuous data streams, which may include event streams 1628 of real-time events and/or event updates 1630, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 1624 may also be configured to output the structured and/or unstructured data feeds 1626, event streams 1628, event updates 1630, and the like to one or more databases that may be in communication with one or more streaming data source computers coupled to computer system 1600.

Computer system 1600 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 1600 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, other ways and/or methods to implement the various embodiments should be apparent.

In the foregoing description, for the purposes of explanation, numerous specific details were set forth in order to provide a thorough understanding of various embodiments. It will be apparent, however, that some embodiments may be practiced without some of these specific details. In other instances, well-known structures and devices are shown in block diagram form.

The foregoing description provides exemplary embodiments only, and is not intended to limit the scope, applicability, or configuration of the disclosure. Rather, the foregoing description of various embodiments will provide an enabling disclosure for implementing at least one embodiment. It should be understood that various changes may be made in the function and arrangement of elements without departing from the spirit and scope of some embodiments as set forth in the appended claims.

Specific details are given in the foregoing description to provide a thorough understanding of the embodiments. However, it will be understood that the embodiments may be practiced without these specific details. For example, circuits, systems, networks, processes, and other components may have been shown as components in block diagram form in order not to obscure the embodiments in unnecessary detail. In other instances, well-known circuits, processes, algorithms, structures, and techniques may have been shown without unnecessary detail in order to avoid obscuring the embodiments.

Also, it is noted that individual embodiments may have been described as a process which is depicted as a flowchart, a flow diagram, a data flow diagram, a structure diagram, or a block diagram. Although a flowchart may have described the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "computer-readable medium" includes, but is not limited to, portable or fixed storage devices, optical storage devices, wireless channels and various other mediums capable of storing, containing, or carrying instruction(s) and/or data. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc., may be passed, forwarded, or transmitted via any suitable means including memory sharing, message passing, token passing, network transmission, etc.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

In the foregoing specification, features are described with reference to specific embodiments thereof, but it should be recognized that not all embodiments are limited thereto. Various features and aspects of some embodiments may be used individually or jointly. Further, embodiments can be utilized in any number of environments and applications beyond those described herein without departing from the broader spirit and scope of the specification. The specification and drawings are, accordingly, to be regarded as illustrative rather than restrictive.

Additionally, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

What is claimed is:

1. A non-transitory computer-readable medium comprising instructions that, when executed by one or more processors, cause the one or more processors to perform operations comprising:
   receiving a patch to be applied to a first database in a database system;
   sending a notification to a server instance, wherein the server instance comprises a thread that holds a connection to the first database, and the notification causes the thread to refresh the connection to a second database when the thread is idle;
   determining that the connection to the first database has been refreshed such that the thread is instead connected to the second database; and
   causing the patch to be applied to the first database in response to determining that the connection to the first database has been refreshed.

2. The non-transitory computer-readable medium of claim 1, wherein the second database comprises and mirror or copy of the first database.

3. The non-transitory computer-readable medium of claim 2, wherein the second database comprises a plurality of databases which together provide the mirror or copy of the first database.

4. The non-transitory computer-readable medium of claim 1, further comprising sending a first notification to the database system that causes the database system to redirect incoming connection requests for the first database to the second database, wherein the first notification comprises an indication that the patch will be applied to the first database.

5. The non-transitory computer-readable medium of claim 1, wherein:
   a request for a connection to the first database is received by the database system from a second thread operating on the server instance; and
   the database system establishes a connection to the second database instead of a connection to the first database.

6. The non-transitory computer-readable medium of claim 1, wherein:
   the connection to the first database is maintained until a time after the notification is received by the server instance when the thread becomes idle.

7. The non-transitory computer-readable medium of claim 1, wherein the notification is addressed to a process or kernel associated with the thread and passed through a messaging system of the server instance.

8. The non-transitory computer-readable medium of claim 1, wherein the notification is addressed to the server instance, and the server instance generates a message through an internal messaging system of the server instance that instructs a process or kernel associated with the thread to refresh the connection when the thread is idle.

9. The non-transitory computer-readable medium of claim 1, wherein the server instance comprises a kernel or process that includes the thread among a plurality of threads, and wherein the plurality of threads further comprises a main thread that controls how jobs are distributed to other threads in the plurality of threads.

10. The non-transitory computer-readable medium of claim 9, wherein the main thread places a lock on the thread in response to receiving the notification, wherein the lock prevents the thread from being assigned a new job from a workload until the connection is refreshed.

11. The non-transitory computer-readable medium of claim 10, wherein the main thread removes the lock when the main thread determines when a current job executed by the thread is completed and the thread becomes idle.

12. The non-transitory computer-readable medium of claim 11, wherein the main thread causes the thread to refresh the connection after the lock is removed and prior to receiving a new job from a workload.

13. The non-transitory computer-readable medium of claim 1, wherein refreshing the connection comprises terminating the connection and requesting a new connection to the second database.

14. The non-transitory computer-readable medium of claim 1, wherein determining that the connection to the first database has been refreshed comprises sending one or more polling messages to the server instance until the server instance responds with an indication that any connections to the first database have been refreshed to instead connect to the second database.

15. The non-transitory computer-readable medium of claim 1, wherein determining that the connection to the first database has been refreshed comprises sending one or more polling messages to the database system until the database system responds with an indication that any connections to the first database have been refreshed to instead connect to the second database.

16. The non-transitory computer-readable medium of claim 1, wherein the operations further comprise:
  receiving an indication that the patch has been applied to the first database;
  sending a third notification to the database system that causes the database system to redirect incoming connection requests for the second database to the first database; and
  sending a fourth notification to the server instance, wherein the fourth notification causes the thread to refresh the connection when the thread is idle.

17. The non-transitory computer-readable medium of claim 1, wherein the operations further comprise:
  receiving an indication that the patch has been applied to the first database;
  sending a third notification to the database system that causes the database system to redirect incoming connection requests for the second database to the first database; and
  allowing existing connections to the second database to expire over time.

18. The non-transitory computer-readable medium of claim 1, wherein the operations further comprise:
  receiving an indication that the patch has been applied to the first database;
  receiving a patch to be applied to the second database, and in response:
    sending a third notification to the database system that causes the database system to redirect incoming connection requests for the second database to the first database; and
    sending a fourth notification to the server instance, wherein the fourth notification causes the thread to refresh the connection when the thread is idle.

19. A method of applying patches to databases that maintain static connections to threads in multiple server instances, the method comprising:
  receiving a patch to be applied to a first database in a database system;
  sending a notification to a server instance, wherein the server instance comprises a thread that holds a connection to the first database, and the notification causes the thread to refresh the connection to a second database when the thread is idle;
  determining that the connection to the first database has been refreshed such that the thread is instead connected to the second database; and
  causing the patch to be applied to the first database in response to determining that the connection to the first database has been refreshed.

20. A system comprising:
  one or more processors; and
  one or more memory devices comprising instructions that, when executed by the one or more processors, cause the one or more processors to perform operations comprising:
    receiving a patch to be applied to a first database in a database system;
    sending a notification to a server instance, wherein the server instance comprises a thread that holds a connection to the first database, and the notification causes the thread to refresh the connection to a second database when the thread is idle;
    determining that the connection to the first database has been refreshed such that the thread is instead connected to the second database; and
    causing the patch to be applied to the first database in response to determining that the connection to the first database has been refreshed.

\* \* \* \* \*